(12) United States Patent
Iida et al.

(10) Patent No.: US 7,058,207 B2
(45) Date of Patent: Jun. 6, 2006

(54) PICTURE SYNTHESIZING APPARATUS

(75) Inventors: Ryosuke Iida, Yokohama (JP);
Kazufumi Mizusawa, Kawasaki (JP);
Michio Miwa, Urayasu (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 642 days.

(21) Appl. No.: 10/067,745

(22) Filed: Feb. 8, 2002

(65) Prior Publication Data
US 2002/0110262 A1    Aug. 15, 2002

(30) Foreign Application Priority Data
Feb. 9, 2001  (JP) ............................. 2001-034093
Jun. 8, 2001  (JP) ............................. 2001-174415

(51) Int. Cl.
G06K 9/00    (2006.01)

(52) U.S. Cl. ...................... 382/104; 382/293; 340/988; 340/932.2

(58) Field of Classification Search ................ 382/104, 382/154, 293, 295; 348/113, 116, 118, 119; 345/419, 420; 340/988, 436, 437, 932.2, 340/461, 431
See application file for complete search history.

(56) References Cited

U.S. PATENT DOCUMENTS 2,736,885 A * 2/1956 Thompson .................. 340/431
5,109,213 A * 4/1992 Williams .................... 340/447

FOREIGN PATENT DOCUMENTS

| EP | 1005234 | 5/2000 |
|---|---|---|
| EP | 1065642 | 1/2001 |
| EP | 1065642 A2 * | 1/2001 |
| EP | 1123844 | 8/2001 |
| JP | 2610146 | 2/1997 |
| KR | 2000-168475 | 6/2000 |
| WO | WO0032279 A1 | 6/2000 |
| WO | WO0033279 A1 | 6/2000 |
| WO | WO0064175 A1 | 10/2000 |

OTHER PUBLICATIONS

Okamoto et al, "Development of Parking Assistance System Using Virtual Viewpoint Image Synthesis", the 7th ITS International Conference, 2000.*

"The Principle of virtual viewpoint image synthesis using a road surface model" Shunsuke Okamoto et al.; the 7th ITS International Conference.

* cited by examiner

Primary Examiner—Brian Werner
Assistant Examiner—Christopher Lavin
(74) Attorney, Agent, or Firm—Michael G. Gilman

(57) ABSTRACT

There is disclosed a picture synthesizing apparatus for superimposing an auxiliary image upon an image converted as if the image were photographed with a virtual viewpoint, displaying the image in a monitor, and providing the image such that an approach to a surrounding solid object can easily be predicted from the monitor image. The picture synthesizing apparatus includes: an image pickup unit 101 disposed in a car; a viewpoint change image synthesizing unit 102 for changing a viewpoint of the image obtained by the image pickup unit 101 and synthesizing the image; a car straight locus line generation unit 103 for generating a locus line at an arbitrary height of the car, when the car linearly advances; and a car locus line drawing unit 104 for drawing the locus line generated by the car straight locus line generation unit 103 on the image synthesized by the viewpoint change image synthesizing unit 102.

60 Claims, 25 Drawing Sheets

FIG. 5.

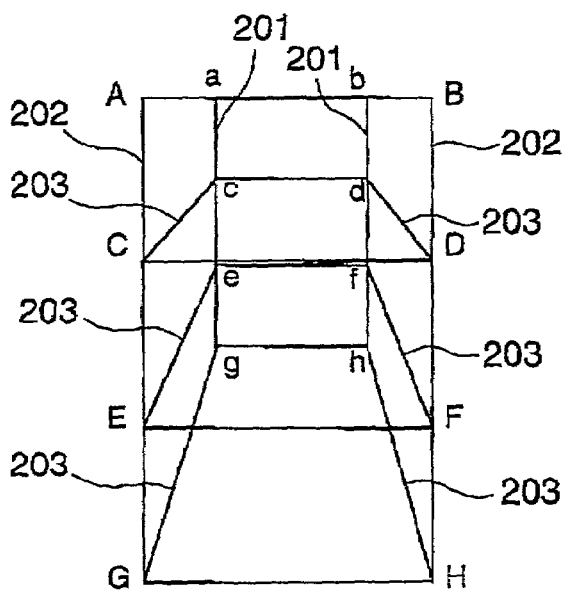

LINE ab: LINE OF REAR END OF CAR (ON ROAD SURFACE)

LINE AB: LINE OF REAR END OF CAR (HEIGHT OF 50 cm FROM ROAD SURFACE)

LINE cd: LINE OF 1 m BEHIND CAR (ON ROAD SURFACE)

LINE CD: LINE OF 1 m BEHIND CAR (HEIGHT OF 50 cm FROM ROAD SURFACE)

LINE ef: LINE OF 2 m BEHIND CAR (ON ROAD SURFACE)

LINE EF: LINE OF 2 m BEHIND CAR (HEIGHT OF 50 cm FROM ROAD SURFACE)

LINE gh: LINE OF 3 m BEHIND CAR (ON ROAD SURFACE)

LINE GH: LINE OF 3 m BEHIND CAR (HEIGHT OF 50 cm FROM ROAD SURFACE)

LOCUS LINE OF HEIGHT OF CAR

LOCUS LINE ON ROAD SURFACE

LOCUS LINE OF BUMPER END

WHEEL OF CAR

BUMPER END OF CAR

EMPHASIZED DISPLAY

PICTURE SYNTHESIZING APPARATUS

BACKGROUND OF THE INVENTION

1. Field of the Invention

The present invention relates to a picture synthesizing apparatus, particularly to a picture synthesizing apparatus preferable for use in an apparatus which changes a viewpoint, converts images obtained by a plurality of image pickup devices disposed in a car to images from a virtual viewpoint, synthesizes the images, provides an image around the car to a driver, and helps the driver to drive the car, for example, at a parking time.

2. Description of the Related Art

As a conventional image display apparatus, an apparatus has been known which changes a viewpoint of an image actually photographed by a camera, converts the image as if the image were photographed from a virtual viewpoint, and displays the image in a monitor as disclosed in "the Principle of virtual Viewpoint Image Synthesis using a Road Surface Model" (the $7^{th}$ ITS International Conference). Moreover, an apparatus described in Japanese Patent No. 2610146 has been known which superimposes a predicted backward locus corresponding to a steering angle detected by a vehicular steering angle sensor upon an image of a camera mounted in the car.

However, in the conventional image display apparatus, the predicted backward locus is superimposed upon the image converted as if the image were photographed with the virtual viewpoint, and the image is displayed in the monitor. In this case, there is a problem that a distance to a surrounding solid object is wrongly recognized to be longer than an actual distance in the image of the monitor.

This respect will be described with reference to the drawing. In FIG. 30, a distance between an illustrated own car 2401 and another car 2402 seems to be still sufficiently long in a monitor image. In actual, however, as shown in FIG. 31, the car 2401 is considerably close to the other car 2402. This is because the viewpoint is changed to the virtual viewpoint, and thereby objects apart from the ground such as a bumper are projected into a position farther from a camera than an actual position in the converted image.

SUMMARY OF THE INVENTION

The present invention has been developed to solve the conventional problem, and an object of the present invention is to provide a picture synthesizing apparatus for superimposing an auxiliary image upon an image converted as if the image were photographed with a virtual viewpoint, and displaying the image in a monitor in order to provide an image such that an approach to a surrounding solid object can easily be predicted from the monitor image.

According to the present invention, there is provided a picture synthesizing apparatus including: image pickup means mounted in a car; viewpoint change image synthesizing means for changing a viewpoint of an image obtained by the image pickup means and synthesizing the image; car locus line generation means for generating at least one of a locus line of an arbitrary height of the car and a vertical line; and car locus line drawing means for drawing the locus line generated by the car locus line generation means on the image synthesized by the viewpoint change image synthesizing means. By this constitution, the locus line of the arbitrary height of the car is generated, and displayed on the synthesized image obtained by changing a viewpoint, so that a solid locus of the car can be drawn on the synthesized image. Therefore, when the locus of the car is distorted similarly as distortion of a surrounding solid object occurring during viewpoint change and image synthesis, a three-dimensional position relation between surroundings and a predicted locus of the car can easily be grasped, visibility is improved, and it becomes easy to judge contact between the car and the surrounding solid object.

Moreover, according to the present invention, there is provided a picture synthesizing apparatus including: image pickup means disposed in a car; viewpoint change image synthesizing means for changing a viewpoint of an image obtained by the image pickup means and synthesizing the image; auxiliary line generation means for generating an auxiliary line of an arbitrary position from the car; and auxiliary line drawing means for drawing the auxiliary line generated by the auxiliary line generation means on the image synthesized by the viewpoint change image synthesizing means. By this constitution, the auxiliary line of the arbitrary position from the car is generated, and displayed on the synthesized image obtained by changing a viewpoint. The auxiliary line as a measure of a distance is drawn on the synthesized image, and a driver can easily grasp the distance from another car approaching from behind during driving.

Furthermore, according to the present invention, there is provided a picture synthesizing apparatus including: image pickup means disposed in a car; viewpoint change image synthesizing means for changing a viewpoint of an image obtained by the image pickup means and synthesizing the image; storage means for storing predetermined data beforehand; and drawing means for superimposing predetermined auxiliary data on the image synthesized by the viewpoint change image synthesizing means based on the data read from the storage means. The image pickup means is disposed so that a rear edge of the car is positioned within a field of view, and the viewpoint change image synthesizing means changes the viewpoint and synthesizes the image including an image of the car. By the constitution, a conversion/synthesis result of the image of the rear edge of the car can be provided to the driver, and it can be easy to judge contact between the car and a solid object around the car.

According to the present invention, there is provided an image display apparatus comprising: display means for displaying an image synthesized by the picture synthesizing apparatus; and display data conversion control means for converting the image to be displayed into data suitable for the display means.

By this constitution, the image obtained by the image pickup means or the synthesized image can be displayed in the display means, so that an operator can easily grasp a position relation between a surrounding situation and the car.

Moreover, according to the present invention, there is provided an image acquirement warning apparatus comprising: detection means for detecting an approaching state of a connection object connected to a car; and warning means for generating arbitrary warning information to an operator based on at least one information of detected information of the detection means and image information synthesized by the picture synthesizing apparatus. The warning information is issued in accordance with the approaching state of the arbitrarily set connection object.

By this constitution, when the connection object is connected to a rear part of a car body, and the connection object is approaching, the warning information is issued in response to the approaching state, and an operator's attention can be called. Moreover, it is also possible to confirm a completed state at a time of completion of connection.

Furthermore, according to the present invention, there is provided a car position recognition apparatus comprising: image detection means for detecting an image of an arbitrary object from an image obtained by rear image pickup means which is disposed behind a car to constitute one of image pickup means of the picture synthesizing apparatus, or an image synthesized by the picture synthesizing apparatus; recognition means for recognizing a position relation between the image detected by the image detection means and the image of the car; and comparison judgment means for comparison and judgment with an arbitrary set condition.

By the constitution, the image obtained by the image pickup means or the synthesized image can be displayed in the display means, and provided to the operator, so that the operator can easily grasp the position of the object (including an object display), or the position relation between the object and the car from the surrounding situation, particularly from the image of the arbitrarily set object.

BRIEF DESCRIPTION OF THE DRAWINGS

FIG. 5 is an explanatory view of details of the locus line of FIG. 2.

DETAILED DESCRIPTION OF THE PREFERRED EMBODIMENTS

Embodiments of the present invention will be described hereinafter in detail with reference to the drawings.

First Embodiment

Figure 1:
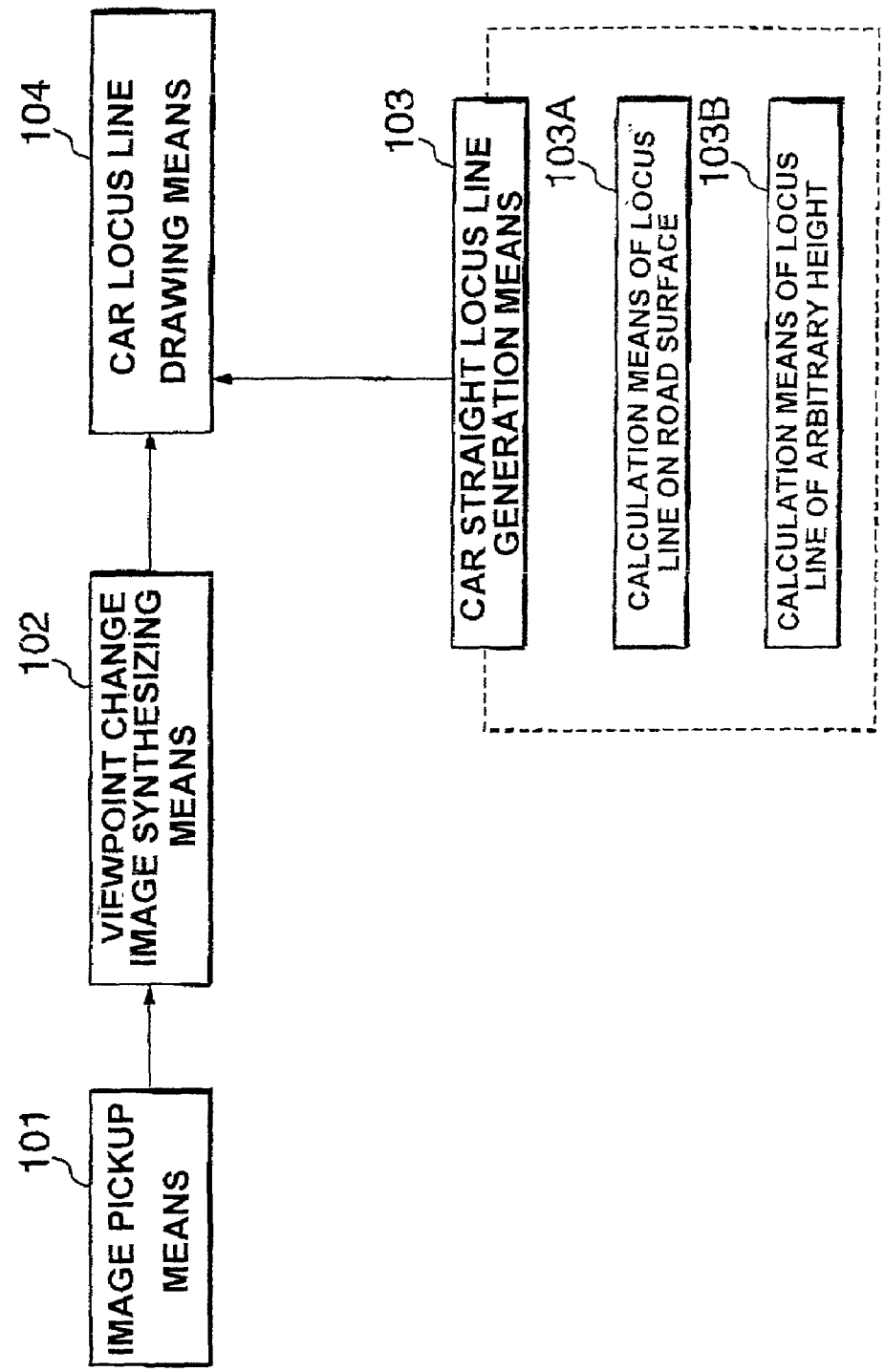
FIG. 1 is a block diagram showing a constitution of a picture synthesizing apparatus according to a first embodiment of the present invention.

FIG. 1 is a block diagram showing a constitution of a picture synthesizing apparatus according to a first embodiment. The picture synthesizing apparatus is constituted of image pickup means 101 disposed in a car, viewpoint change image synthesizing means 102, car straight locus line generation means 103, and car locus line drawing means 104.

The image pickup means 101 is constituted of one or more cameras disposed in a rear or side part of the car, and turns to the rear of the car. The viewpoint change image synthesizing means 102 inputs one or more images obtained by the image pickup means 101, and outputs a synthesized image viewed from a virtual viewpoint. The car straight locus line generation means 103 inputs a size and shape of the car, camera parameter for changing the viewpoint, and image pickup situation of the image pickup means 101, and outputs a locus line in a case in which the car runs straight backwards. The car straight locus line generation means 103 includes locus line calculation means 103A on a road surface and locus line calculation means 103B having an arbitrary height. The means can output the locus line of an arbitrary position of the car, and has a function of outputting, for example, a locus on the road surface, locus of a bumper end of the car, and the like at the same time. Car locus line drawing means 104 superimposes and draws the locus line of the car outputted by the car straight locus line generation means 103 onto the synthesized image obtained by the viewpoint change image synthesizing means 102. Additionally, an output of the car locus line drawing means 104 is supplied and displayed into a display device (not shown).

Figure 2:
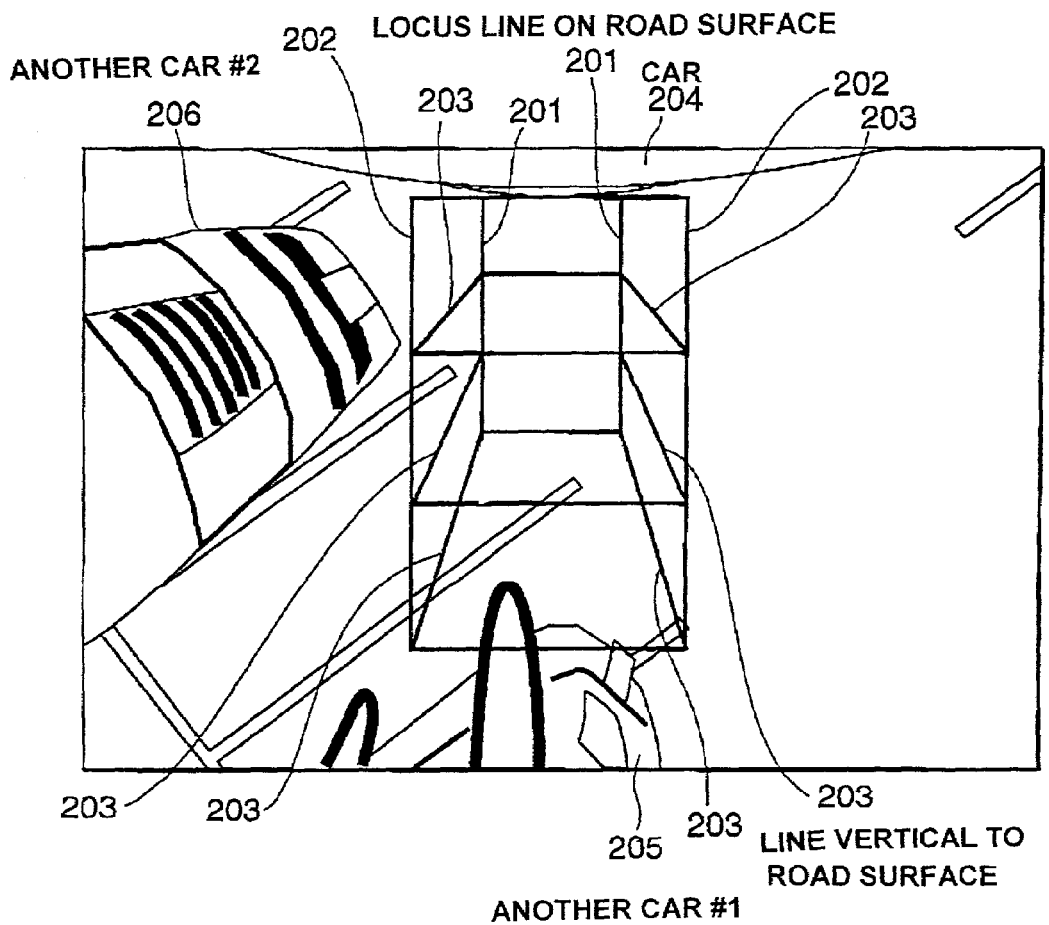
FIG. 2 is an explanatory view of a synthesized image and locus line obtained by the picture synthesizing apparatus of FIG. 1 and viewed vertically downwards.

FIG. 2 shows that the image obtained by the image pickup means 101 is synthesized to obtain an image viewed downwards vertically to the road surface with the car laid thereon from a rear of the car by the viewpoint change image synthesizing means 102, and a locus line 201 on the road surface of a car 204 and locus line 202 of the car at a height of 50 cm from the road surface obtained by the car locus line drawing means 104 are drawn on the synthesized image by the car straight locus line generation means 103. For ease of understanding that a solid object is projected on the synthesized image, the locus line on the road surface 201 and the locus line having the height 202 are connected to each other via a straight line vertical to the road surface 203. Here, another first car 205 exists behind the car 204, and another second car 206 exists beside the car.

Figure 3:
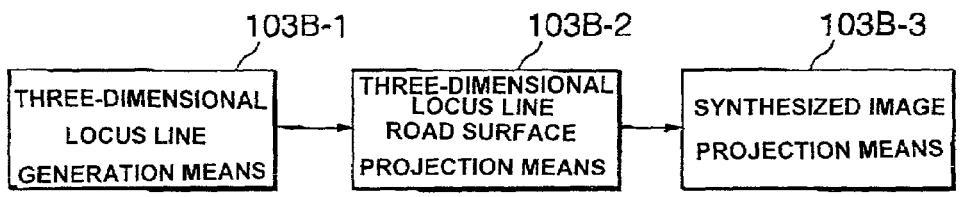
FIG. 3 is a block diagram showing a constitution of locus line calculation means 103B having an arbitrary height in FIG. 1.

FIG. 3 is a block diagram showing a constitution of the locus line calculation means 103B having the arbitrary height in FIG. 1. The arbitrary-height locus line calculation means 103B is constituted of three-dimensional locus line generation means 103B-1, three-dimensional locus line road surface projection means 103B-2, and synthesized image projection means 103B-3. The three-dimensional locus line generation means 103B-1 has a function of generating a three-dimensional locus line of the car at the arbitrary height in a real space. The three-dimensional locus line road surface projection means 103B-2 has a function of projecting the three-dimensional locus line generated by the three-dimensional locus line generation means 103B-1 onto the road surface from the image pickup means attached to the car. The synthesized image projection means 103B-3 has a function of projecting the locus line projected on the road surface by the three-dimensional locus line road surface projection means 103B-2 onto the synthesized image.

Figure 4:
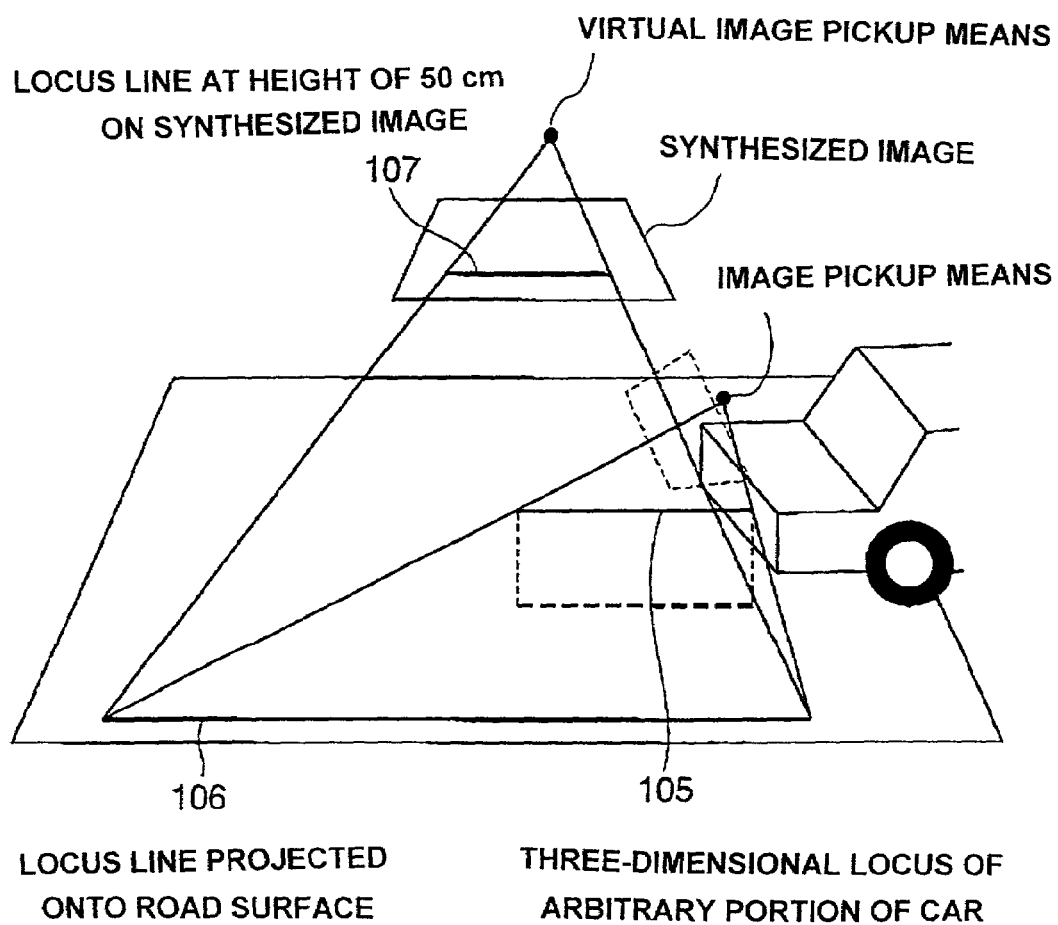
FIG. 4 is an explanatory view of a flow of processing of the locus line calculation means 103B having the arbitrary height in FIG. 1.

FIG. 4 is an explanatory view of a flow of processing of the arbitrary-height locus line calculation means 103B. First, the three-dimensional locus line generation means 103B-1 generates a line segment 105 as a locus line of an arbitrary portion of the car in a three-dimensional space. Subsequently, the line segment 105 is projected onto a line segment 106 on the road surface from the image pickup means attached to the car by the three-dimensional locus line road surface projection means 103B-2. Next, the line segment 106 is projected onto a line segment 107 on the synthesized image by the synthesized image projection means 103B-3. The line segment 107 obtained in this manner is a locus line on the synthesized image.

FIG. 5 is a diagram showing the locus line of FIG. 2 in detail. As shown in FIG. 5, it is assumed that respective points on the locus of the car on the road surface are a to h, and respective points on the locus at a height of 50 cm from the road surface are A to H.

A line ab is a straight line indicating a position of the rear end of the car 204 on the road surface; line cd is a straight line indicating a position of 1 m behind the car 204 on the road surface; line ef is a straight line indicating a position of 2 m behind the car 204 on the road surface; and line gh is a straight line indicating a position of 3 m behind the car 204 on the road surface. Moreover, a line AB is a straight line indicating a height of 50 cm of the rear end of the car 204; line CD is a straight line indicating a height of 50 cm at 1 m behind the car 204; line EF is a straight line indicating a height of 50 cm at 2 m behind the car 204; and line GH is a straight line indicating a height of 50 cm at 3 m behind the car 204. Therefore, it can be supposed that lines Aa, Bb, Cc, Dd, Ee, Ff, Gg, Hh indicate images of rods each having a length of 50 cm and standing vertically to the road surface in respective positions on the road surface on the synthesized image.

With the locus lines determined as described above, for example, for only the road surface displayed in a region inside a square ABCD, it can be said that an object having a height of 50 cm or less is not present at least in a width of the car and at a distance of 1 m behind. Conversely, for a solid object other than the road surface displayed in the square ABCD, it can be said that there is a possibility of presence of the object having the height of 50 cm or less in the width of the car and at the distance of 1 m behind.

Here, in the apparatus of FIG. 1, it is also possible to freely change a color of the locus line to be drawn. For example, it is possible to draw a line segment indicating a range of 1 m from the car in red, draw a line segment indicating a range of 1 m to 2 m in yellow, and draw a line segment indicating a range of 2 m to 3 m in blue. Moreover, loci aceg and bdfh on the road surface are drawn in black or bold lines, and it is then possible to display the loci of car tires so that the loci can easily be seen by intuition.

Moreover, in the apparatus of FIG. 1, it is also possible to draw the locus of the height of a car bumper. When the locus of the height of the car bumper is drawn, it is easy to judge a contact of the car bumper with a surrounding object on the synthesized image.

Furthermore, the locus line is drawn 3 m at maximum behind the car in FIG. 2, but the locus line can be drawn for an arbitrary distance.

Figure 6:
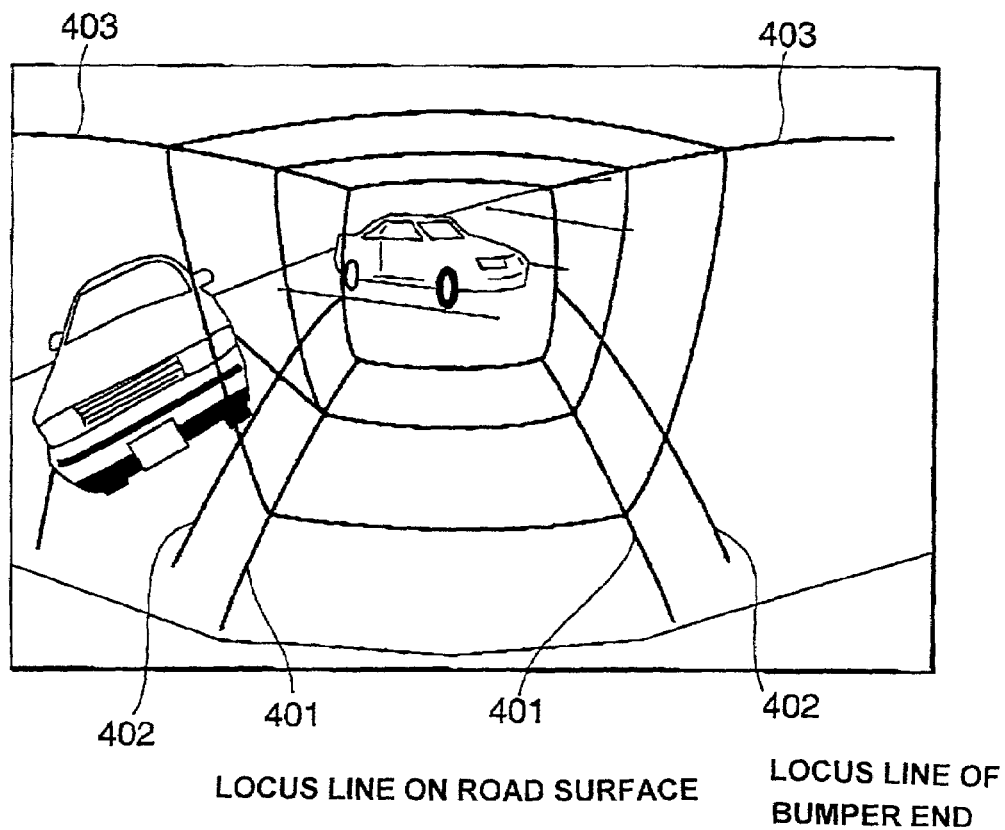
FIG. 6 is an explanatory view of a rear panorama synthesized image and the locus line obtained by the picture synthesizing apparatus of FIG. 1.

FIG. 6 shows that a rear panorama image is synthesized from the image obtained by the image pickup means 101 by the viewpoint change image synthesizing means 102, and a locus 401 of the car on the road surface, locus 402 of a bumper end of the car, and locus 403 of the height of the car are drawn on the synthesized image. When the locus of the height of the car is drawn, it is easy to grasp a sense of distance from a surrounding car.

As described above, according to the first embodiment of the present invention, since it is possible to draw the solid locus of the car on the viewpoint changed synthesized image, a driver can easily judge the contact of the car with the surrounding solid object.

Moreover, when the locus line of the car on the road surface and the locus line at the arbitrary height are interpolated with a straight or curved line, it is also possible to display the line vertical to the road surface or a sectional view of the car on the locus line on the synthesized image.

For example, a scene is assumed in which the car is connected to a load carrier using a load carrier hitch attached to the car. In an initial state in which the load carrier is detached from the car, that is, when the car is brought close to the load carrier, a course of action for bringing the car close to the load carrier as an object is easily established by a displayed presumed locus of the car. Moreover, just before the load carrier is connected, the image is converted as if the image were viewed right from above by changing the viewpoint (plane projection). It is then possible to exactly grasp a position relation between the hitches. By the aforementioned operation and use, the load carrier can easily be connected to the car.

Moreover, during parking into a limited parking space, or during grasping of the position relation of following cars in a plurality of traffic lanes, the image easily understandable for the driver can similarly advantageously be provided.

Furthermore, in the example described above, when the height of a most critical portion, such as the height of the hitch or the bumper, is known beforehand, the locus line at the height may be drawn in response to a driver's instruction.

Additionally, when the locus line of the bumper end is drawn, it is possible to judge the contact of the bumper end. Moreover, when the locus line of the car height is drawn onto the synthesized image, it is possible to draw the locus line easily understandable by intuition.

Furthermore, when the locus line is drawn with various color or thickness in accordance with the distance from the car, a driver's attention can effectively be concentrated in the vicinity of the car.

The picture synthesizing apparatus according to the first embodiment of the present invention can also be used as a superior driving support apparatus having safety for clearly indicating a blind spot in the rear to the driver and convenience during parking or connecting.

Second Embodiment

Figure 7:
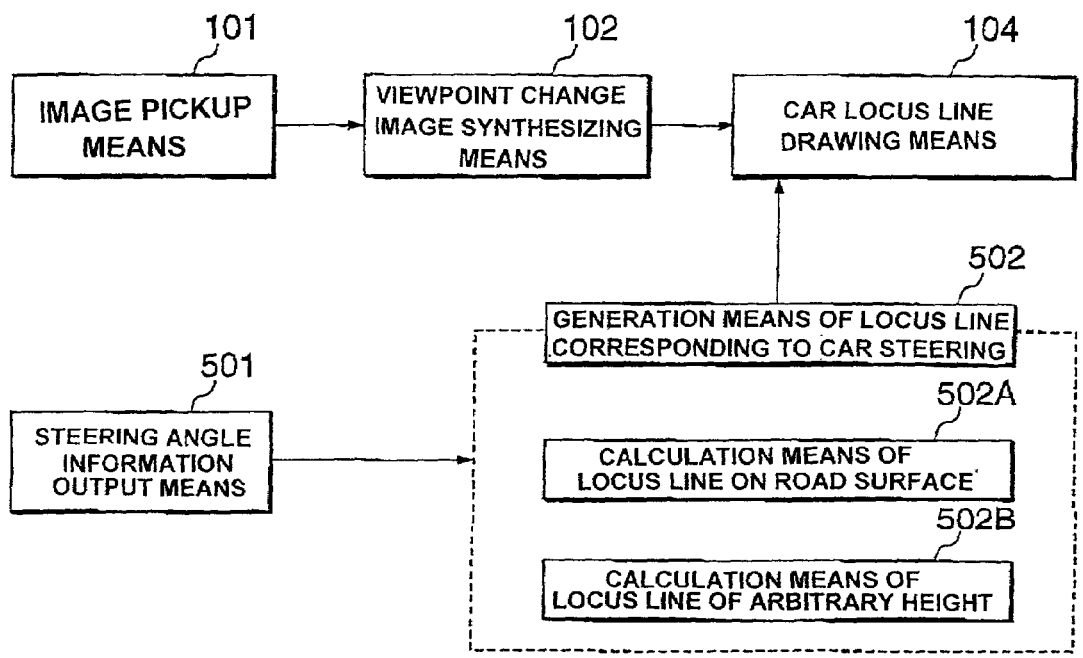
FIG. 7 is a block diagram showing the constitution of the picture synthesizing apparatus according to a second embodiment of the present invention.

FIG. 7 is a block diagram showing the constitution of the picture synthesizing apparatus according to a second embodiment. In FIG. 2, the same constituting elements as those of FIG. 1 or the corresponding constituting elements are denoted with the same reference numerals as those of FIG. 1.

The picture synthesizing apparatus is constituted by disposing car steering angle corresponding locus line generation means 502 instead of the car straight locus line generation means 103, adding steering angle information output means 501, and inputting an output of the means to the car steering angle corresponding locus line generation means 502 in the picture synthesizing apparatus of FIG. 1. Other constituting elements have the same constitution as that of the apparatus of FIG. 1.

The steering angle information output means 501 is a device for outputting a steering wheel angle of the car. The car steering angle corresponding locus line generation means 502 is a device for inputting the steering wheel angle and outputting the locus line corresponding to the steering wheel angle. The car steering angle corresponding locus line generation means 502 includes calculation means 502A of the locus line on the road surface and calculation means 502B of the locus line at the arbitrary height. The means has a function of inputting the steering wheel angle, size and shape of the car, camera parameter for changing the viewpoint, and image pickup situation of the image pickup means 101, and outputting the locus line corresponding to the steering angle in the arbitrary position of the car, when the car runs backwards.

Figure 8:
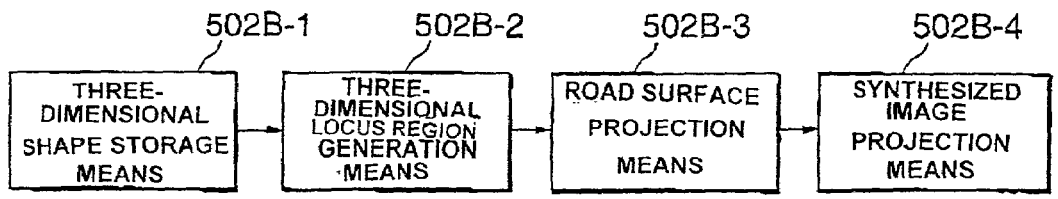
FIG. 8 is a block diagram showing the constitution of calculation means 502B of the locus line having the arbitrary height in FIG. 7.

FIG. 8 is a block diagram showing the constitution of the calculation means 502B of the locus line at the arbitrary height in FIG. 7. The calculation means 502B of the locus line at the arbitrary height is constituted of three-dimensional shape storage means 502B-1, three-dimensional locus region generation means 502B-2, road surface projection means 502B-3, and synthesized image projection means 502B-4. The three-dimensional shape storage means 502B-1 can store the shape of the car, and the shape of a rectangular parallelepiped or a part of the car inscribed by the car such as the bumper and wheel. The three-dimensional locus region generation means 502B-2 has a function of generating a region in the real space through which the shape of the car stored in the three-dimensional shape storage means 502B-1 passes during movement of the car. The road surface projection means 502B-3 has a function of projecting the three-dimensional region generated by the three-dimensional locus region generation means 502B-2 onto the road surface. The synthesized image projection means 502B-4 has a function of projecting the three-dimensional region generated by the road surface projection means 502B-3 onto the synthesized image. Additionally, the shape stored by the three-dimensional shape storage means 502B-1 may be a point of a certain portion of the car. Therefore, the region generated by the three-dimensional locus region generation means 502B-2 can also be a three-dimensional line segment.

Figure 9:
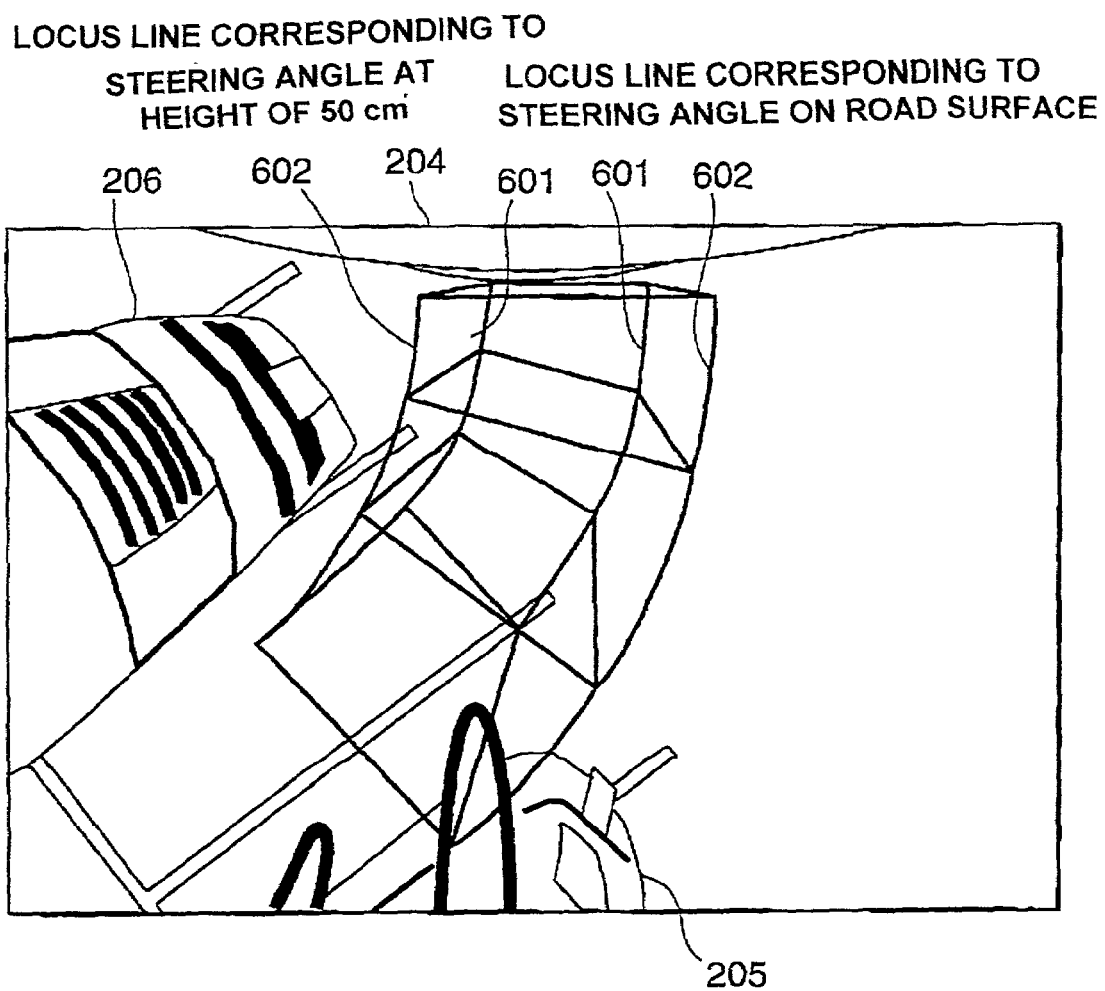
FIG. 9 is an explanatory view of the synthesized image and locus line obtained by the picture synthesizing apparatus of FIG. 7 and viewed backwards.

FIG. 9 shows that the locus line is drawn onto the synthesized image obtained by changing the viewpoint and synthesizing the image in accordance with steering angle information. Here, the three-dimensional shape storage means 502B-1 in the car steering angle corresponding locus line generation means 502 stores the three-dimensional position of a point having a height of 50 cm from the road surface in a corner behind the car. As shown in FIG. 9, a locus line 601 corresponding to the steering angle on the road surface, and a locus line 602 corresponding to the steering angle at the height of 50 cm are displayed. By such display, it is easy to judge the steering wheel angle of the car at which the car contacts the surrounding solid object. The contact with the surrounding solid object can easily be avoided during parking.

Figure 10:
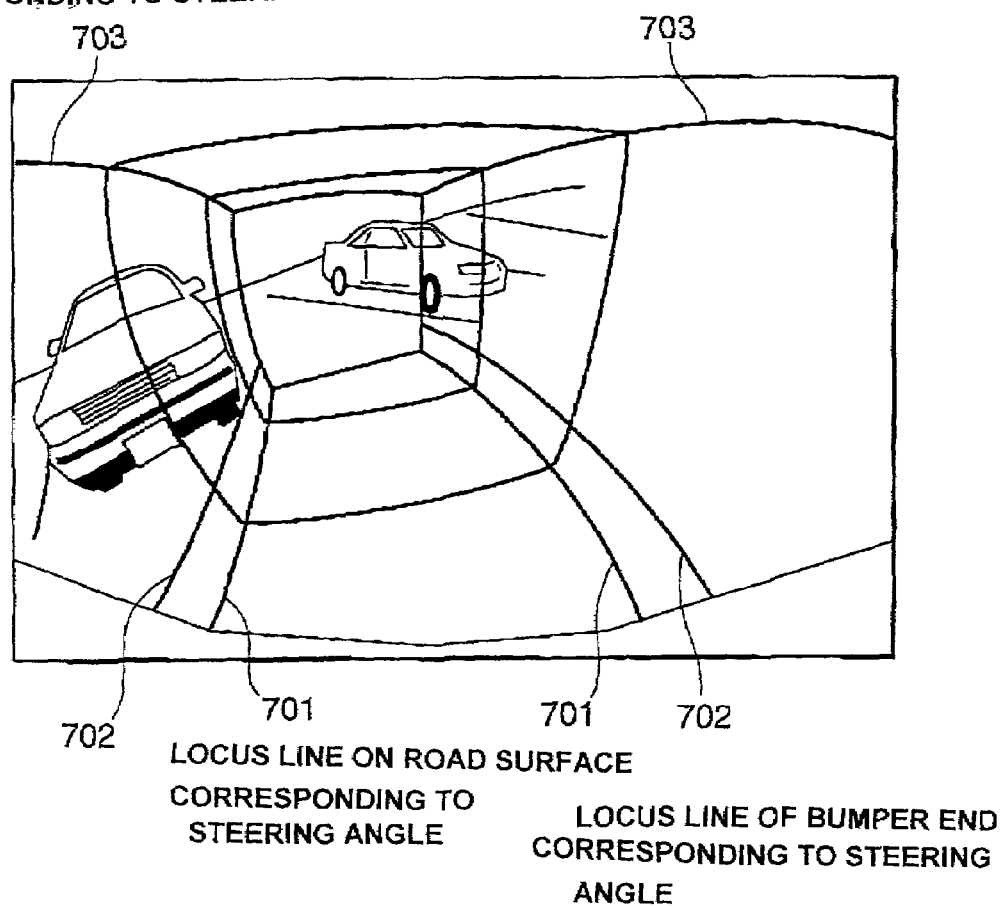
FIG. 10 is an explanatory view of the synthesized image and locus line obtained by the picture synthesizing apparatus of FIG. 7 and viewed vertically downwards.

FIG. 10 shows that the apparatus of FIG. 7 is applied to a rear panorama image. Here, two other cars, a steering angle corresponding locus line 701 on the road surface, a steering angle corresponding locus line 702 at the height of the bumper, and a steering angle corresponding locus line 703 of the car height are displayed behind the car.

Figure 11:
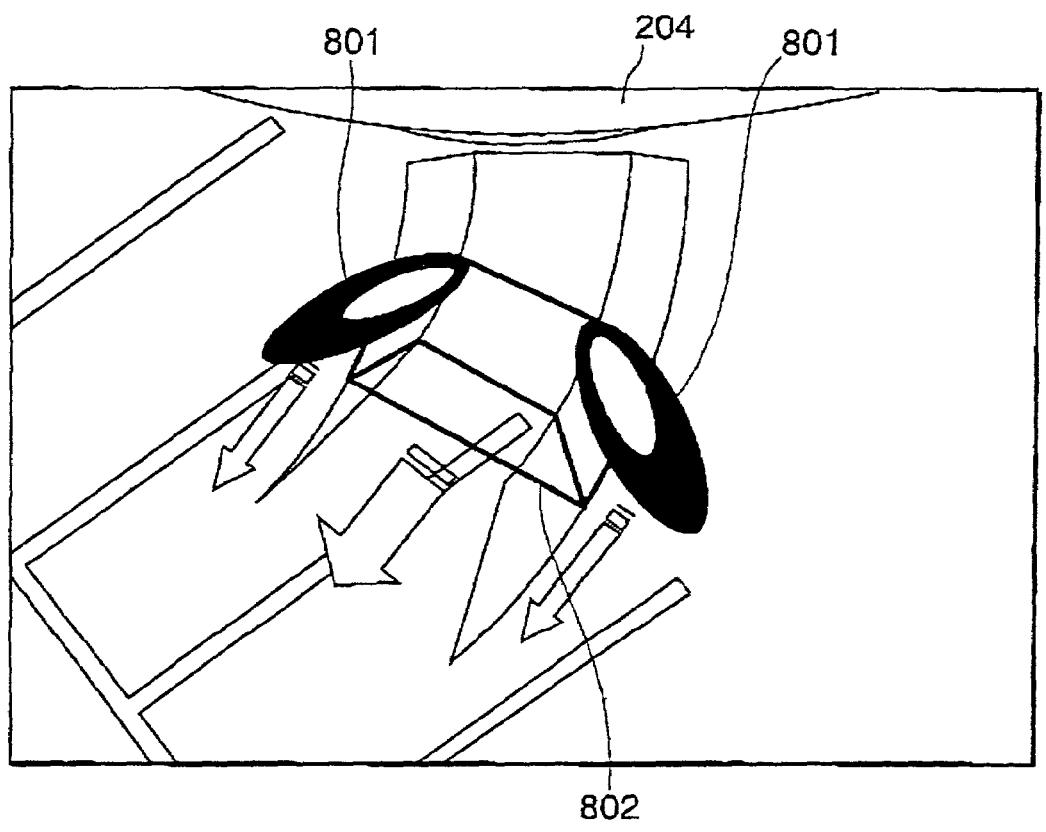
FIG. 11 is an explanatory view of a solid display of the synthesized image, locus line, and car moving with an elapse of time, obtained by the picture synthesizing apparatus of FIG. 7 and viewed vertically downwards.

FIG. 11 shows that the tires and bumper of the car during backward movement of the car are projected on the road surface and drawn on the synthesized image. Here, the three-dimensional shape storage means 502B-1 stores the shapes of the bumper and wheels of the car. The car steering angle corresponding locus line generation means 502 projects a projected image 801 of the wheel of the car 204, and a projected image 802 of the bumper end. The projected image moves backwards from the rear end of the car 204 with an elapse of time in a certain period. Thereby, it is possible to easily grasp the position relation with the surrounding object by intuition, when the car 204 moves. Particularly, when the steering wheel is turned, the locus of the tire and the locus of the bumper differ because of a difference of a rotation radius. Therefore, it is effective to draw a solid model of the car onto the synthesized image as shown in FIG. 8.

As described above, according to the second embodiment of the present invention, the solid locus of the car is drawn in accordance with the steering angle. Therefore, the turning angle of the car steering wheel at which the car contact the surrounding solid object can easily be determined, and the contact with the surrounding solid object can easily be avoided during the parking.

Moreover, the section or the solid model of the car moved along the locus line with the elapse of time so that the car moves apart from the rear end of the car is drawn, and the contact with the solid object can easily be judged.

Third Embodiment

Figure 12:
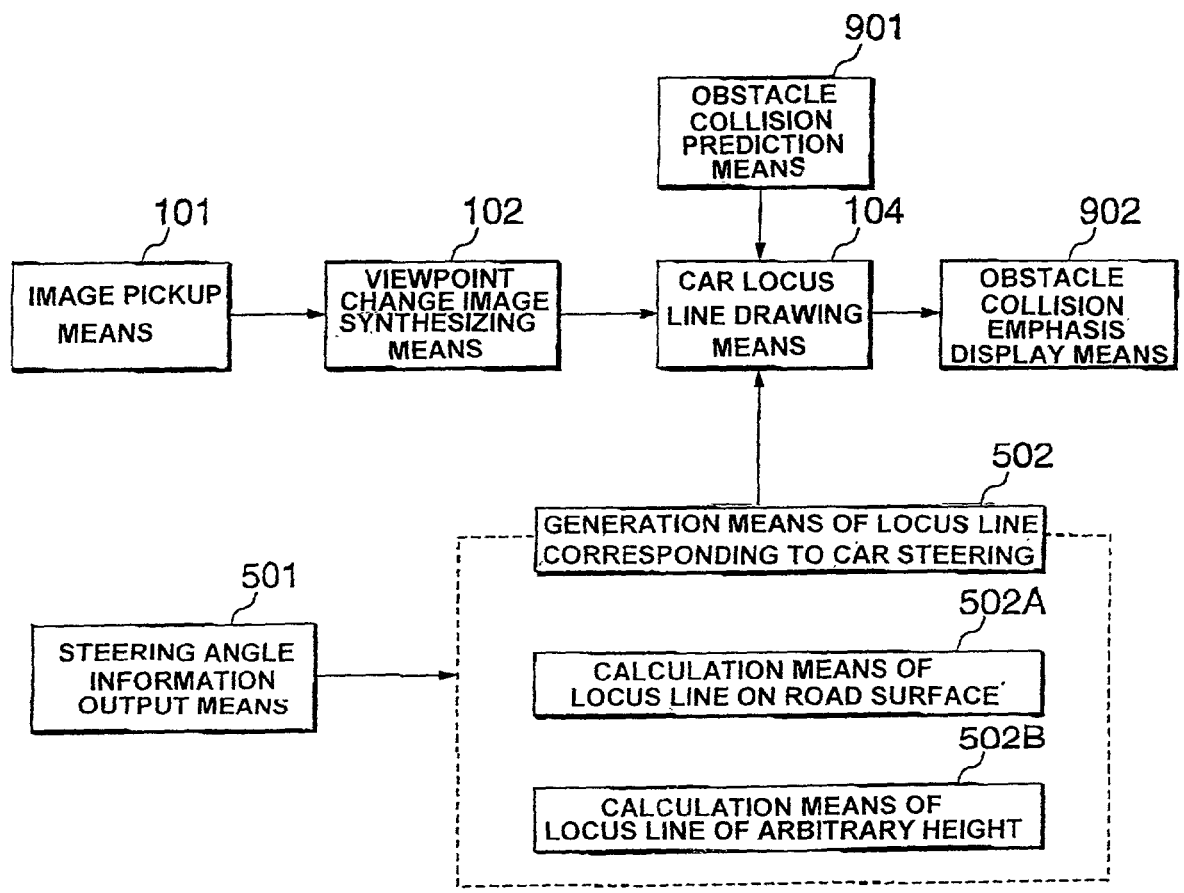
FIG. 12 is a block diagram showing the constitution of the picture synthesizing apparatus according to a third embodiment of the present invention.

FIG. 12 is a block diagram showing the constitution of the picture synthesizing apparatus according to a third embodiment. In FIG. 12, the same constituting elements as those of FIG. 7 or the corresponding constituting elements are denoted with the same reference numerals as those of FIG. 7.

The picture synthesizing apparatus is constituted by adding obstacle collision prediction means 901 and obstacle collision emphasis display means 902 to the apparatus of FIG. 7, and other constituting elements have a constitution similar to the constitution of the apparatus of FIG. 7.

The obstacle collision prediction means 901 is a device for detecting obstacles such as a car present around the car. Moreover, the car locus line drawing means 104 has a function of not drawing the subsequent locus line, when the position of the obstacle detected by the obstacle collision prediction means 901 is judged to collide against the locus line of the car. The obstacle collision emphasis display means 902 has a function of emphasizing/displaying a collision place on the synthesized image, when the locus line of the car is judged to collide against the obstacle.

In the constitution, in the apparatus of FIG. 12, with the obstacle present on the predicted locus line, unnaturalness with which the locus is drawn on the obstacle is eliminated. Moreover, it is possible to display the predicted locus line which can more easily be understood.

Figure 13:
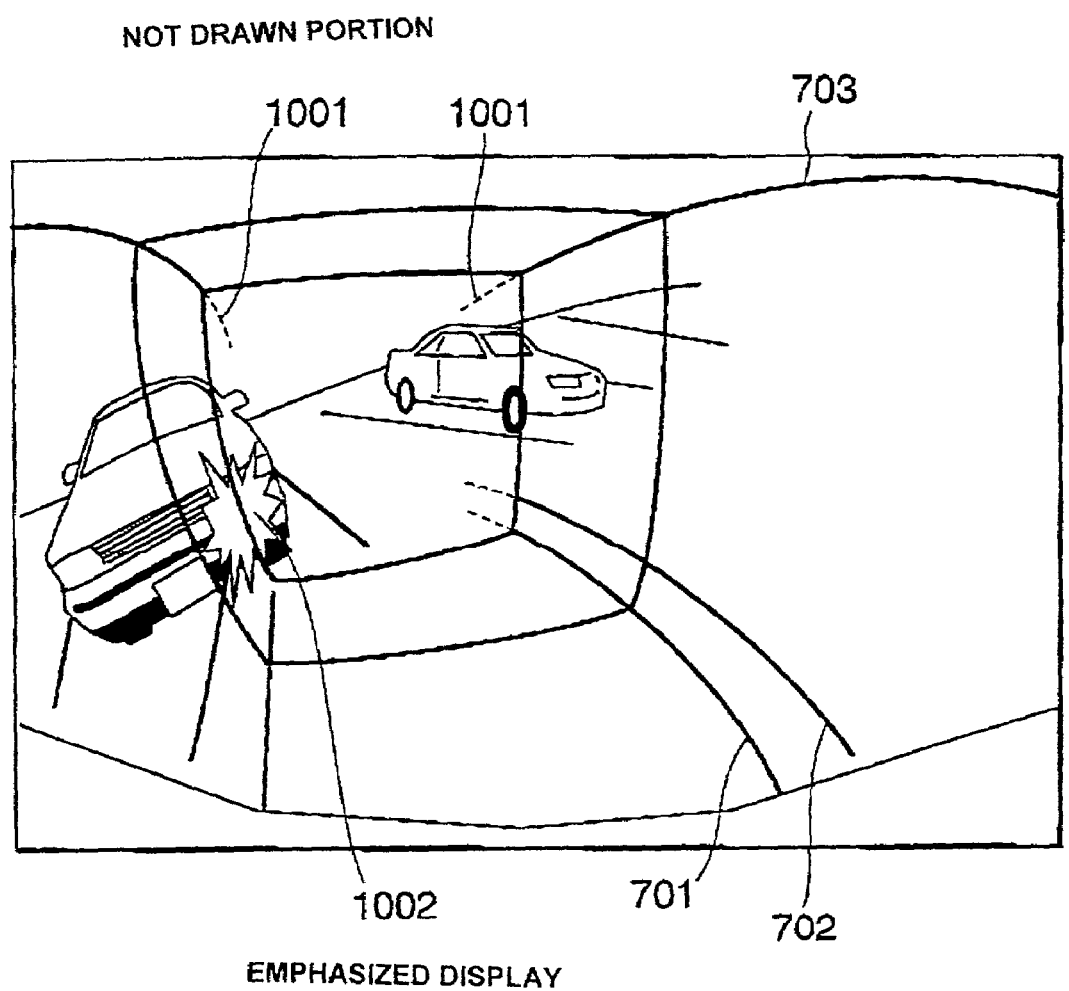
FIG. 13 is an explanatory view of an emphasized display of the rear panorama synthesized image, locus line, and collision place obtained by the picture synthesizing apparatus of FIG. 12.

FIG. 13 shows a panorama image and locus line obtained by the apparatus of FIG. 12. In FIG. 13, a dotted-line portion 1001 of the locus line present before the obstacle is not drawn on the image. Moreover, since the collision place is emphasized/displayed as shown by 1002, it is possible to concentrate the driver's attention onto the collision place.

As described above, according to the third embodiment of the present invention, the locus line is not drawn on the obstacle around the car, and it is therefore possible to prevent an unnatural phenomenon of drawing the locus on a route along which the car cannot originally advance. Therefore, it is possible to draw the locus line with which the surrounding situation can easily be seen.

Moreover, when the collision of the car against the obstacle is predicted, the collision place is emphasized and displayed, and the driver's attention can be called.

Fourth Embodiment

Figure 14:
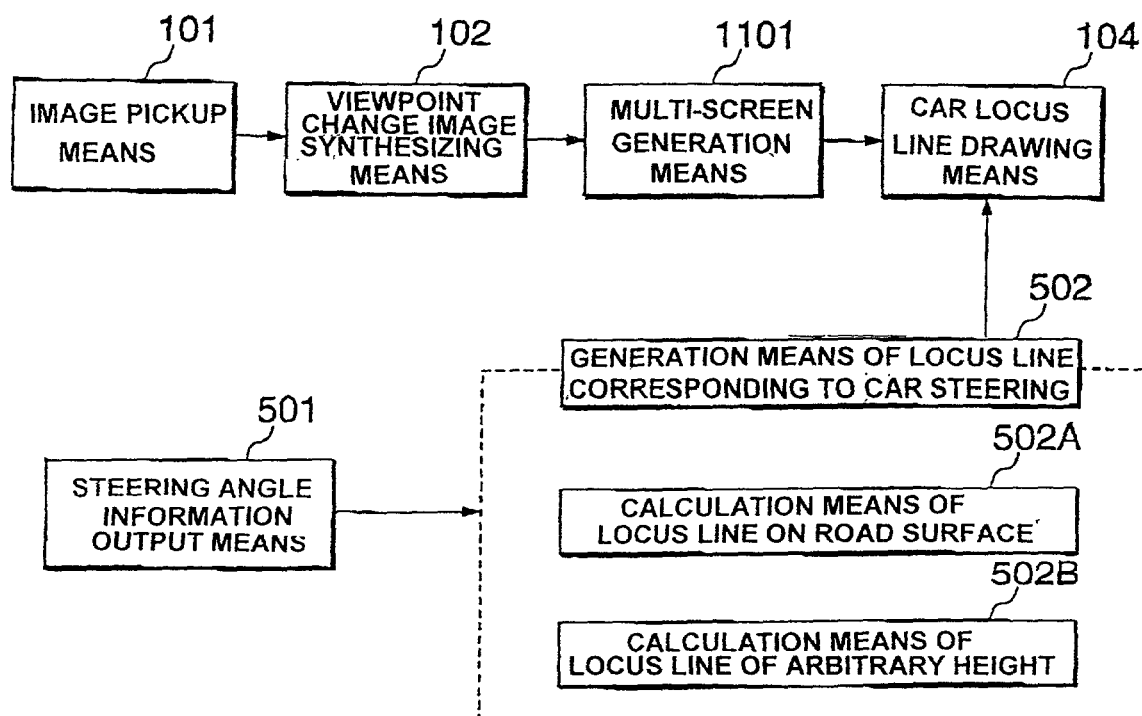
FIG. 14 is a block diagram showing the constitution of the picture synthesizing apparatus according to a fourth embodiment of the present invention.

FIG. 14 is a block diagram showing the constitution of the picture synthesizing apparatus according to a fourth embodiment. In FIG. 14, the same constituting elements as those of FIG. 7 or the corresponding constituting elements are denoted with the same reference numerals as those of FIG. 7.

The picture synthesizing apparatus is constituted by adding multi-screen generation means 1101 to the picture synthesizing apparatus of FIG. 7, and other constituting elements have the constitution similar to that of the apparatus of FIG. 7. Additionally, the image pickup means 101 is disposed in the rear part and opposite side parts of the car to obtain an image for generating multiple screens.

Figure 15:
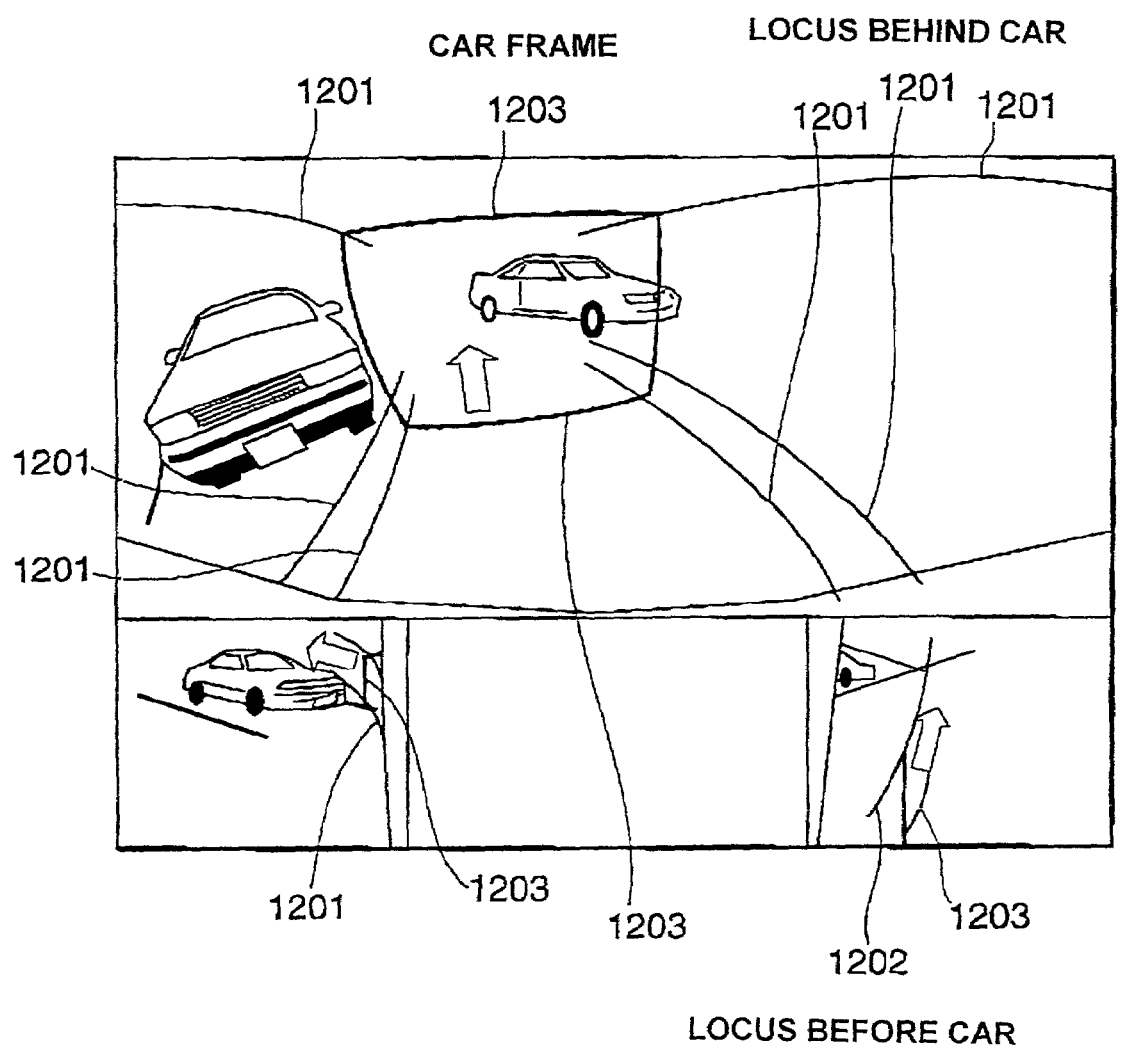
FIG. 15 is an explanatory view of a multi-screen display image and locus line obtained by the picture synthesizing apparatus of FIG. 14.

FIG. 15 is a diagram showing a synthesized image obtained based on the images from the cameras disposed in the rear part and opposite side portions of the car by the picture synthesizing apparatus of FIG. 14, and the car locus lines. About ⅔ upper part of a display region is used to display the images of the camera disposed in the rear part of the car, and about ⅓ lower part of the display region is used to display the images from the cameras disposed in the opposite side portions of the car. Moreover, a locus line 1201 behind the car is drawn in each screen. Furthermore, a locus 1202 in a front corner of the car can also be drawn on the image of the camera which turns to the side of the car. Here, the locus lines or car frames indicating the same position in different screens are displayed in the same color, so that it is preferably easy to handle the locus of the same position of the car even in the different screens.

As described above, according to the fourth embodiment of the present invention, since the loci behind the car are drawn on the images obtained from the cameras in two or more different positions, the three-dimensional position of the locus line can easily be seen, and it is easy to judge the contact with the surrounding obstacle.

Moreover, since the locus lines or the car frames indicating the same position in the different screens are displayed in the same color, it is easy to handle the loci of the same position of the car even in the different screens.

Additionally, the apparatus of FIG. 14 can have a function of moving a frame 1203 of the car with time.

Fifth Embodiment

Figure 16:
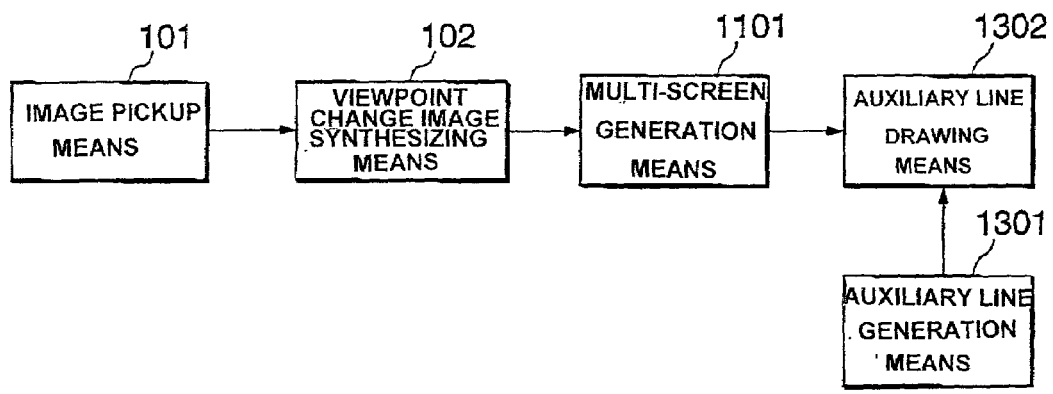
FIG. 16 is a block diagram showing the constitution of the picture synthesizing apparatus according to a fifth embodiment of the present invention.

FIG. 16 is a block diagram showing the constitution of the picture synthesizing apparatus according to a fifth embodiment. In FIG. 16, the same constituting elements as those of FIG. 1 or the corresponding constituting elements are denoted with the same reference numerals as those of FIG. 1.

The picture synthesizing apparatus is constituted by adding the multi-screen generation means 1101 to the picture synthesizing apparatus of FIG. 1, further replacing the locus line generation means 103 with auxiliary line generation means 1301, and replacing the car locus line drawing means 104 with auxiliary line drawing means 1302. The other constituting elements have the same constitution as that of the apparatus of FIG. 1.

The auxiliary line generation means 1301 is a device for generating lines indicating positions 10 m and 20 m behind the car on the synthesized image. Moreover, the auxiliary line drawing means 1302 superimposes and draws auxiliary lines outputted from the auxiliary line generation means 1301 onto the synthesized image obtained by the multi-screen generation means 1101.

Figure 17:
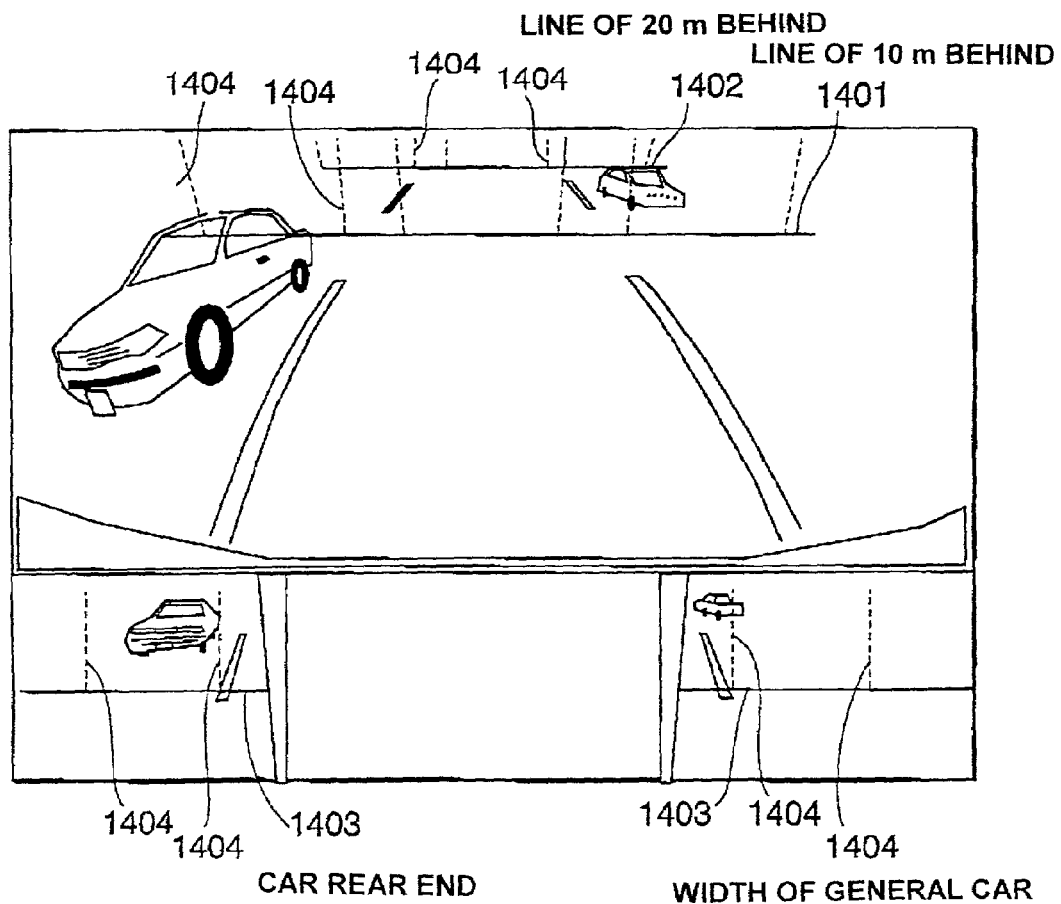
FIG. 17 is an explanatory view of a multi-screen display image and auxiliary line obtained by the picture synthesizing apparatus of FIG. 16.

FIG. 17 shows the synthesized image obtained by the picture synthesizing apparatus of FIG. 16. Here, an auxiliary line 1401 at 10 m behind the car, and an auxiliary line 1402 at 20 m behind the car are displayed. It is easy to grasp the distance from the car approaching from behind by the auxiliary lines 1401 and 1402. Moreover, it is also possible to draw an auxiliary line 1403 obtained by projecting the line indicating the rear end of the car vertically onto the road surface. It is easily judged by the auxiliary line 1403 whether another car trying to get ahead of the car is running behind the rear end of the car or beside the car. Moreover, another car running beside the car can smoothly be checked during changing of the traffic lane. Furthermore, an auxiliary line 1404 indicating a width of a general car can be displayed on the auxiliary lines 1401, 1402, 1403. Thereby, the car approaching from behind runs close to a certain scale line, and the width of the car becomes substantially the same as the auxiliary line 1403. It is then seen that the car is running in the vicinity of the auxiliary line.

As described above, according to the fifth embodiment of the present invention, when the auxiliary line is drawn as a measure of the distance on the synthesized image, it is easy for the driver to grasp the distance from the car approaching from behind during running.

Moreover, the auxiliary line indicating the position of the rear end of the car is generated on the image obtained by photographing from the side of the car, or the synthesized image of the image. Therefore, it is easy to see that the front end of another car running beside the car is present behind or before the rear end of the car, and this is effective during the changing of the traffic lane.

Furthermore, since the auxiliary line indicating the general car width is drawn on these auxiliary lines, it is possible to more easily grasp the distance from the surrounding car.

Sixth Embodiment

Figure 18:
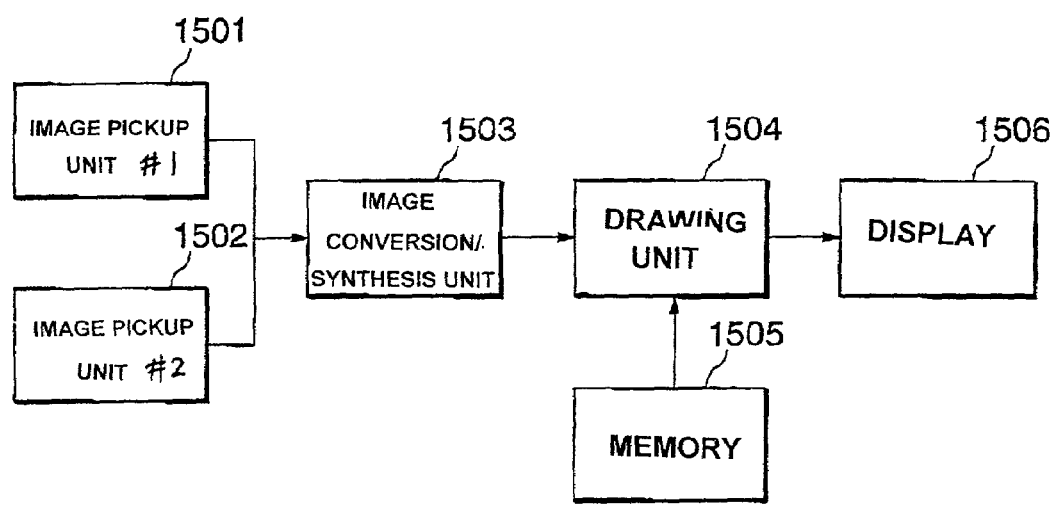
FIG. 18 is a block diagram showing the constitution of an image synthesis/display apparatus according to a sixth embodiment of the present invention.

FIG. 18 is a block diagram showing the constitution of an image synthesis/display apparatus according to a sixth embodiment. The image synthesis/display apparatus is constituted of a first image pickup unit 1501 and second image pickup unit 1502 disposed in the car, an image conversion/synthesis unit 1503, a drawing unit 1504, a memory 1505, and a display 1506. Here, the first image pickup unit 1501 and second image pickup unit 1502 correspond to the image pickup means 101 of FIG. 1, and the image conversion/synthesis unit 1503 corresponds to the viewpoint change image synthesizing means 102.

Figure 19:
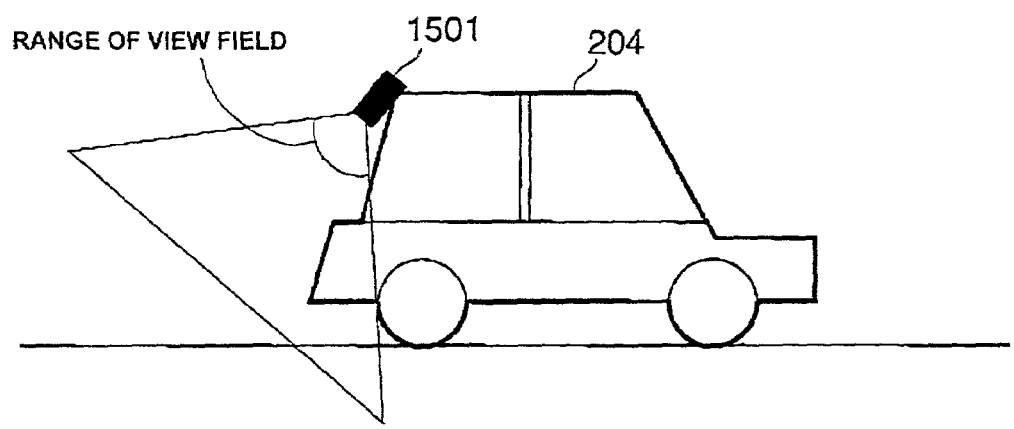
FIG. 19 is a layout of an image pickup unit of the image synthesis/display apparatus according to the sixth embodiment of the present invention.

The first and second image pickup units 1501 and 1502 photograph the rear of the car. The images obtained by the first and second image pickup units 1501 and 1502 are converted to an image photographed from a virtual viewpoint by the image conversion/synthesis unit 1503. The drawing unit 1504 draws illustration, auxiliary line, and the like to be superimposed upon the output image based on data stored in the memory 1505. The image drawn by the drawing unit 1504 is displayed in the display 1506. Additionally, FIG. 18 shows two image pickup units, but any number of units may be disposed as long as the units can be handled by the image conversion/synthesis unit 1503. As shown in FIG. 19, the first and second image pickup units 1501 and 1502 are disposed in the rear part of the car 204 so that the bumper of the car 204 and a part of the car body behind are positioned within a field of view of the units.

Figure 20:
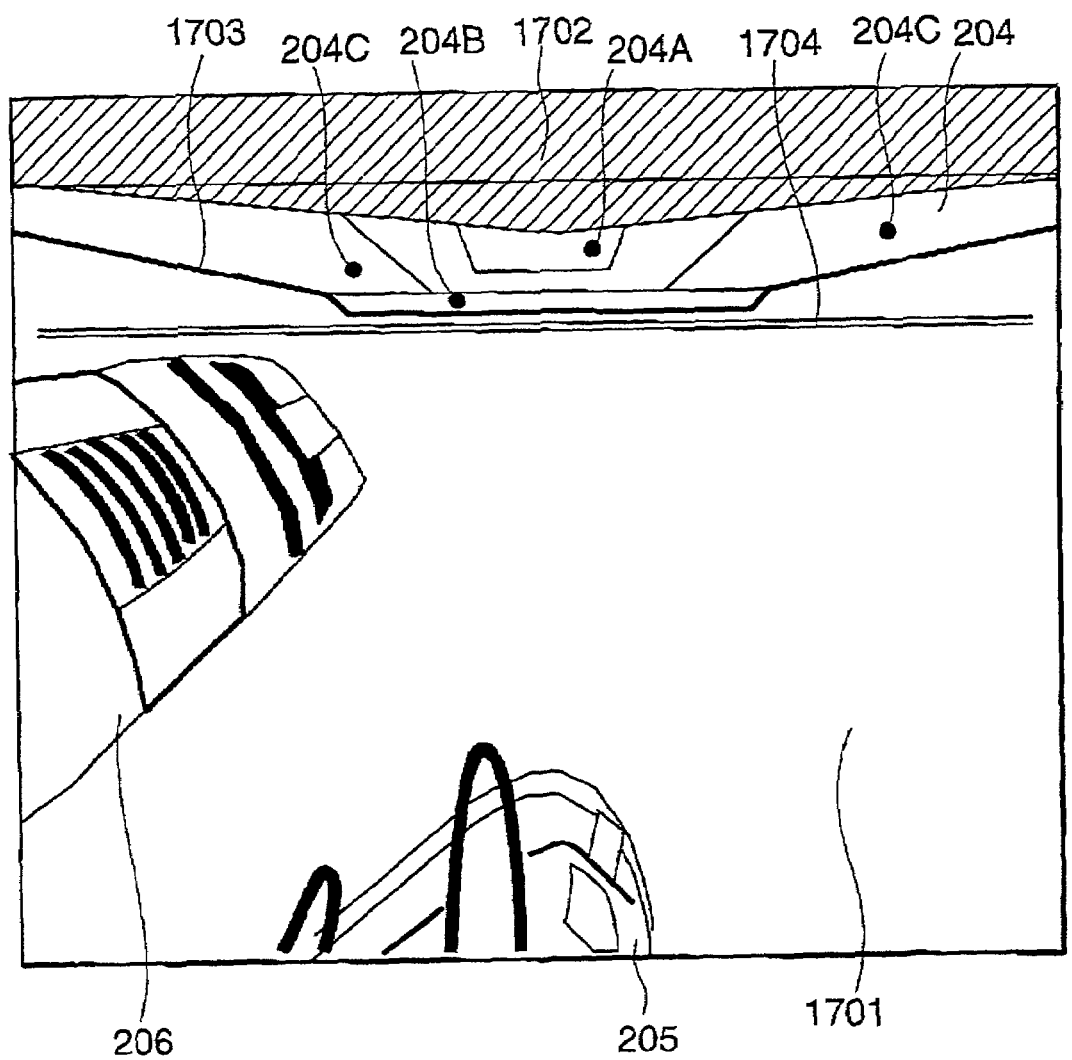
FIG. 20 is a screen constitution diagram of the image synthesis/display apparatus according to the sixth embodiment of the present invention.

A screen constitution of the image synthesis/display apparatus constituted as described above will be described with reference to FIG. 20. FIG. 20 shows a display example of conversion to an image displayed as if the image pickup unit were disposed in a position apart from the car rear end by about 2 m.

Here, the car 204, another first car 205 behind, another second car 206 positioned beside and behind, and road surface 1701 are displayed. A meshed portion 1702 is a road surface outside the view field of the image pickup unit.

Moreover, a rear number plate 204A, bumper 204B, and stop lamp 204C of the car 204 are displayed. Furthermore, an auxiliary line 1703 is superimposed upon the rear end of the bumper and a rear edge position of a car body to emphasize the rear edge of the car. In this case, the auxiliary is drawn outside an actual rear edge, or a bold auxiliary line is drawn, so that a danger of contact can be reduced.

Moreover, a mirror confirmation line 1704 is drawn at a constant distance behind the rear end of the bumper 204B and horizontally with the bumper 204B. The mirror confirmation line 1704 is an auxiliary line for separating the displayed image into two regions: a dangerous region within the same region as that of the car; and a safe region in a region different from that of the car. The line has a function of urging the driver to check collision with the surrounding object by a mirror. That is, when the object displayed around the car contacts the mirror confirmation line 1704 during driving, the driver can check possibility of the collision with the surrounding object at an optimum timing. Additionally, the mirror confirmation line 1704 may be a curve drawn outside the rear edge of the body and the rear end of the bumper displayed in the image by a constant distance, or a curve enclosing the rear edge of the car.

As described above, according to the sixth embodiment of the present invention, the image pickup unit is disposed so that the bumper of the car and a part of the car behind are positioned within the view field, and the image including the image of the car is subjected to viewpoint change, and synthesized. It is then easy to judge the contact between the car and the solid object around the car.

Moreover, the auxiliary line is superimposed upon the positions of the rear end of the bumper and rear edge of the car, and the image for emphasizing/displaying the positions is provided. Therefore, the rear edge of the car can easily be distinguished, and the contact can more easily be judged.

Furthermore, the image is provided in which the mirror confirmation line is displayed behind the rear end of the bumper of the car by the constant distance and horizontally with the bumper. Therefore, the driver can be urged to check the safety around the car by the mirror at the optimum timing.

Seventh Embodiment

Figure 21:
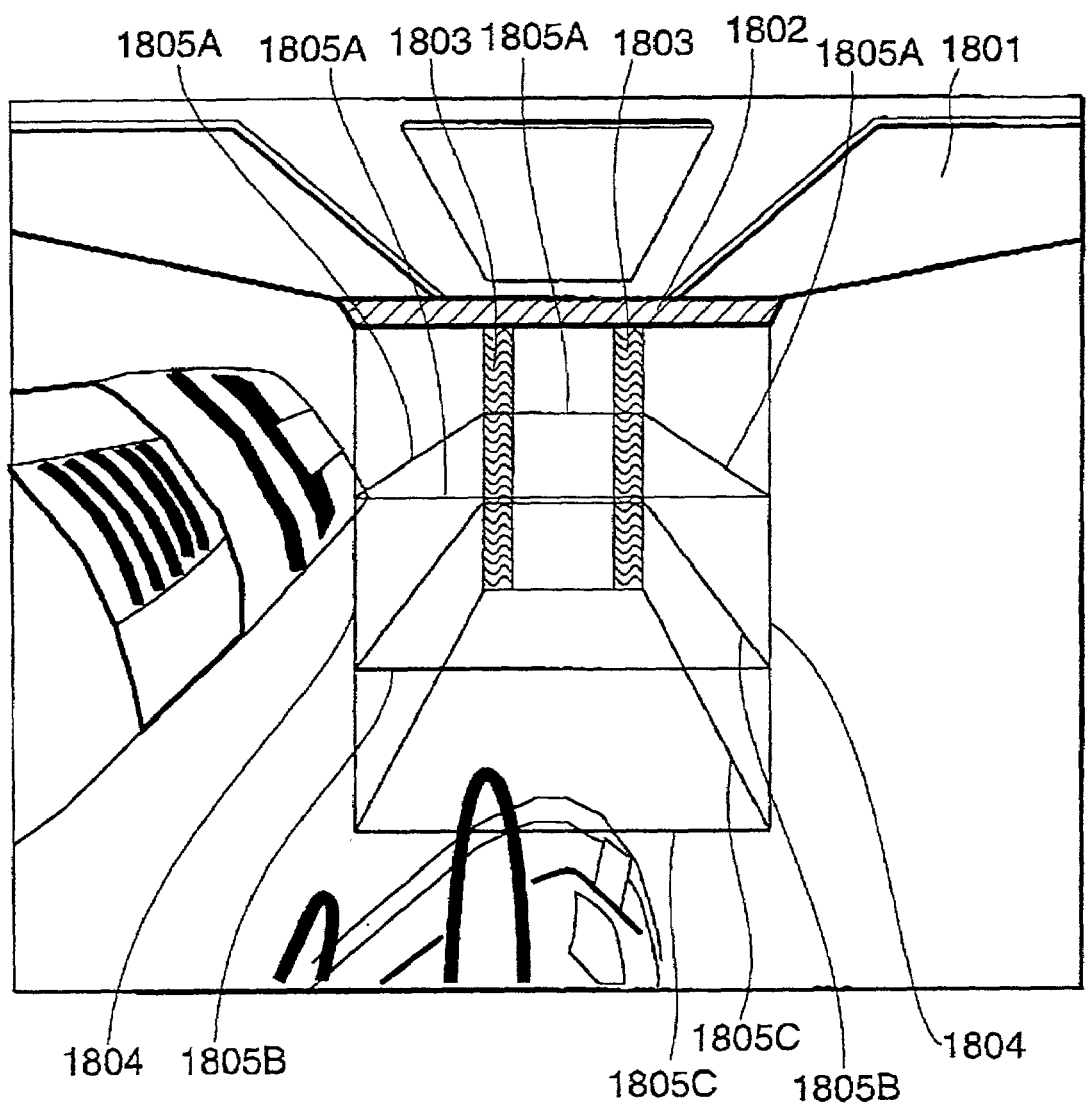
FIG. 21 is a screen constitution diagram of the image synthesis/display apparatus according to a seventh embodiment of the present invention.

The constitution of the image synthesis/display apparatus of a seventh embodiment is the same as that of FIG. 18. FIG. 21 is a screen constitution diagram according to the seventh embodiment.

In FIG. 21, a three-dimensional illustration 1801 of the car is displayed. The illustration 1801 is prepared as the converted image viewed from the virtual viewpoint in a position apart from the car rear end by about 2 m, and is superimposed upon a region corresponding to that of the car of the displayed image.

Moreover, an auxiliary line 1802 indicates a bumper region. In the region, an image obtained by converting the image actually obtained by the image pickup unit may be displayed. Thereby, a sense of security that the actual image is viewed can be given to the driver. In this case, the illustration of the bumper region is drawn larger than the actual car position, so that the danger of contact can be reduced.

Furthermore, an auxiliary line 1803 is a locus of passage on the road surface indicating a position obtained by projecting the position passed by the body end onto the road surface, when the car linearly runs backwards. Moreover, an auxiliary line 1804 is a bumper passage locus indicating the position passed by the bumper end, when the car linearly runs backwards. Furthermore, auxiliary lines 1805A to 1805C are solid auxiliary lines which connect points of the passage locus on the road surface at the constant distance from the car to points on the bumper end passage locus.

Additionally, it is possible to display not only the passage locus of the bumper end of the car, but also the passage locus of the body end of the car corresponding to the height of the bumper of another appropriate car which height could be different from that of the car.

As described above, according to the seventh embodiment of the present invention, the three-dimensional illustration prepared as the car image obtained by the actually disposed image pickup unit and converted/synthesized is superimposed upon the displayed image, and the car is displayed in a solid manner in the image. Therefore, it is easy to grasp the position relation between the car and the solid object around the car in a three-dimensional manner. As a result, contact judgment is facilitated.

Moreover, the image obtained by transforming/synthesizing the actually taken image is displayed in the region of the illustration corresponding to the bumper, and therefore the sense of security that the actual image is viewed can be given to the driver.

Furthermore, the displayed image is provided which includes the road surface passage locus indicating the position obtained by projecting the position passed by the body end onto the road surface, the bumper end passage locus indicating the position passed by the bumper end during the backward driving of the car, and the solid auxiliary line for connecting these loci to generate a solid sense. Therefore, it becomes easy to grasp the position relation between two passage loci in a solid manner.

Eighth Embodiment

Figure 22:
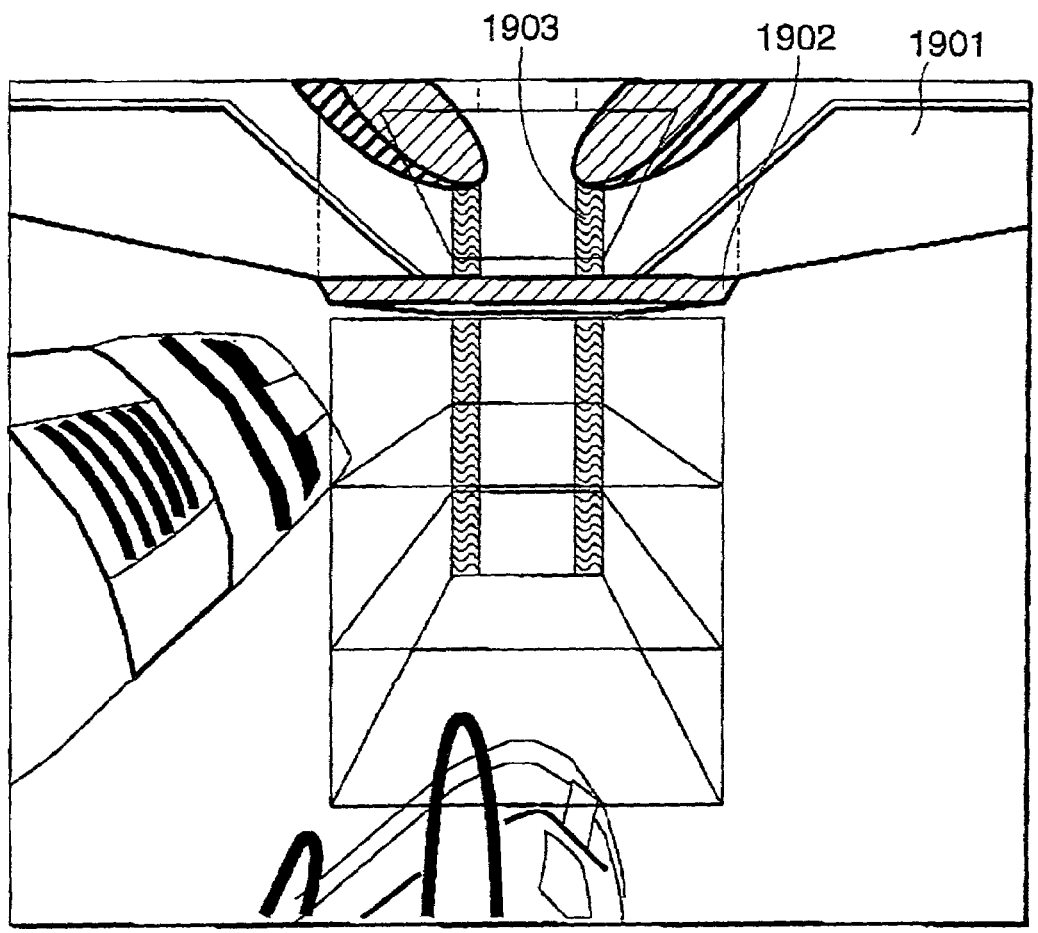
FIG. 22 is a screen constitution diagram of the image synthesis/display apparatus according to an eighth embodiment of the present invention.

The constitution of the image synthesis/display apparatus of an eighth embodiment is the same as that of FIG. 18. FIG. 22 is a screen constitution diagram according to the eighth embodiment.

In FIG. 22, an illustration 1901 is a three-dimensional illustration representing a skeleton of the car and also representing the tire so that a position of the car tire in contact with the road surface can be checked. The illustration 1901 is prepared as the image viewed from the virtual viewpoint disposed in a position apart from the car rear end by about 2 m, and is superimposed upon the region corresponding to the car in the displayed image. Additionally, the car may be represented in a wire frame.

Moreover, an auxiliary line 1902 indicates the bumper region. The image obtained by converting the image actually obtained by the image pickup unit may be displayed in the region. Furthermore, an auxiliary line 1903 is a road surface passage locus drawn from the tire in the illustration 1901. Thereby, the meaning of the road surface passage locus can easily be grasped by intuition.

As described above, according to the eighth embodiment of the present invention, there is provided the image in which the illustration of the car is represented in the skeleton or the wire frame, and the tire position is explicitly displayed. Thereby, the solid sense of the car can be emphasized, and the tire position on the road surface can be understood by intuition. With the converted image viewed from the virtual viewpoint in the position apart from the car rear end by about 2 m, the position relation between the car and the solid object around the car can easily be grasped in the three-dimensional manner, and the contact judgment is facilitated.

Ninth Embodiment

Figure 23:
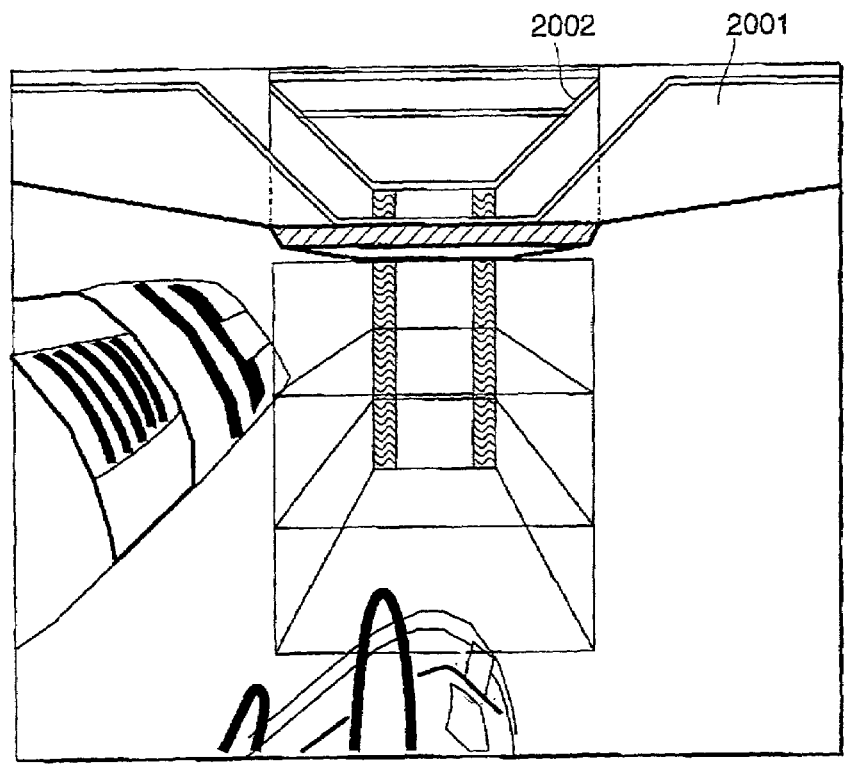
FIG. 23 is a screen constitution diagram of the image synthesis/display apparatus according to a ninth embodiment of the present invention.

The constitution of the image synthesis/display apparatus of a ninth embodiment is the same as that of FIG. 18. FIG. 23 is a screen constitution diagram according to the ninth embodiment.

In FIG. 23, a first wall surface 2001 is an illustration of a wall surface which is disposed vertically to the road surface in the rear end position of the car and which has the same width as that of the car. The wall surface 2001 is prepared as the converted image viewed from the virtual viewpoint in the position apart from the car rear end by about 2 m, and superimposed upon the region corresponding to the rear end position of the car in the displayed image. Moreover, a second wall surface 2002 is an illustration of the wall surface which is laid inside the car and which has the same width as the car width. The second wall surface 2002 is prepared similarly as the first wall surface 2001, and superimposed upon an appropriate position in the displayed image. Here, the second wall surface 2002 is drawn so that the contact portion with the road surface is visible.

Additionally, it is also possible to draw an illustration of the car rear part in the first wall surface 2001, or to draw an illustration of the tire in the contact portion of the second wall surface 2002 with the road surface.

As described above, according to the ninth embodiment of the present invention, there is provided the image in which the illustrations of two wall surfaces disposed in the rear end position of the car and inside the car from the rear end position and vertically to the road surface, and having the same width as that of the car are superimposed upon the displayed image, and the car is metaphorically represented by the solid object. Thereby, the car can be grasped in the solid manner. Therefore, the position relation between the car and the solid object around the car can easily be grasped in the three-dimensional manner, and the contact judgment is facilitated.

Tenth Embodiment

Figure 24:
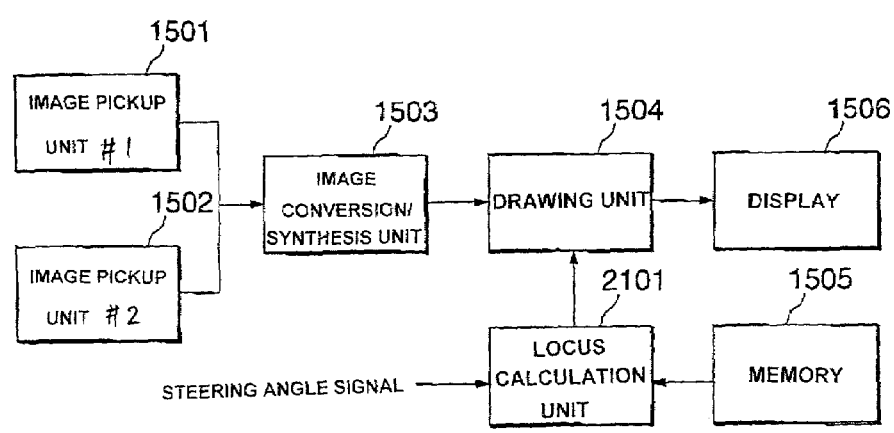
FIG. 24 is a block diagram showing the constitution of the image synthesis/display apparatus according to a tenth embodiment of the present invention.

FIG. 24 is a block diagram showing the constitution of the image synthesis/display apparatus according to a tenth embodiment. In FIG. 24, the same constituting elements as those of FIG. 18 or the corresponding constituting elements are denoted with the same reference numerals as those of FIG. 18.

In FIG. 24, a locus calculation unit 2101 calculates the locus of passage of the car moving backwards with the current steering angle based on a steering wheel angle signal of the car inputted from the outside. The drawing unit 1504 draws the illustration, auxiliary line, and the like to be superimposed upon the output image based on the data stored in the memory 1505, and the predicted passage locus of the car inputted from the locus calculation unit 2101.

In the screen constitution of the tenth embodiment, the auxiliary lines 1803, 1804, 1805A to 1805C in the screen of FIG. 21 are curved in accordance with the steering angle like the auxiliary lines 601, 602 in FIG. 9.

As described above, according to the tenth embodiment of the present invention, there is provided the displayed image which includes the road surface passage locus indicating the position obtained by projecting the position passed by the body end of the car onto the road surface in accordance with the steering angle of the car, the bumper end passage locus indicating the position passed by the bumper end of the car, and the solid auxiliary line for connecting the loci to produce the solid sense. Thereby, in the backward movement, the actual passage predicted locus can be displayed in the solid manner in accordance with the steering angle of the car so that the locus can easily be grasped. The driver can refer to the displayed screen to operate the steering wheel in an optimum manner.

Additionally, these auxiliary lines may be displayed together with the actual image or the illustration of the car as shown in the sixth to ninth embodiments (FIGS. 20 to 23). The road surface passage locus may be displayed like a tire trace. Alternatively, the bumper end passage locus may be connected to the bumper end of the actual image or the illustration of the car and displayed. To display the passage locus of the body end having the appropriate height, the locus is connected to the car position corresponding to the height.

Moreover, the car may be represented in the skeleton or the wire frame. In this case, the road surface passage locus 1903 may be drawn from the tire in the illustration. Thereby, the meaning of the road surface passage locus can easily be grasped by intuition.

Furthermore, these auxiliary lines are displayed together with the actual image or the illustration of the car, the road surface passage locus is displayed like the tire trace, or the bumper end passage locus is connected to the bumper end of the actual image or the illustration of the car and displayed. Thereby, the relation between two passage loci and the car may easily be grasped by intuition.

Additionally, the mirror confirmation line is simultaneously displayed, so that the driver can grasp the portion to be checked at the optimum timing by intuition.

Eleventh Embodiment

Figure 25:
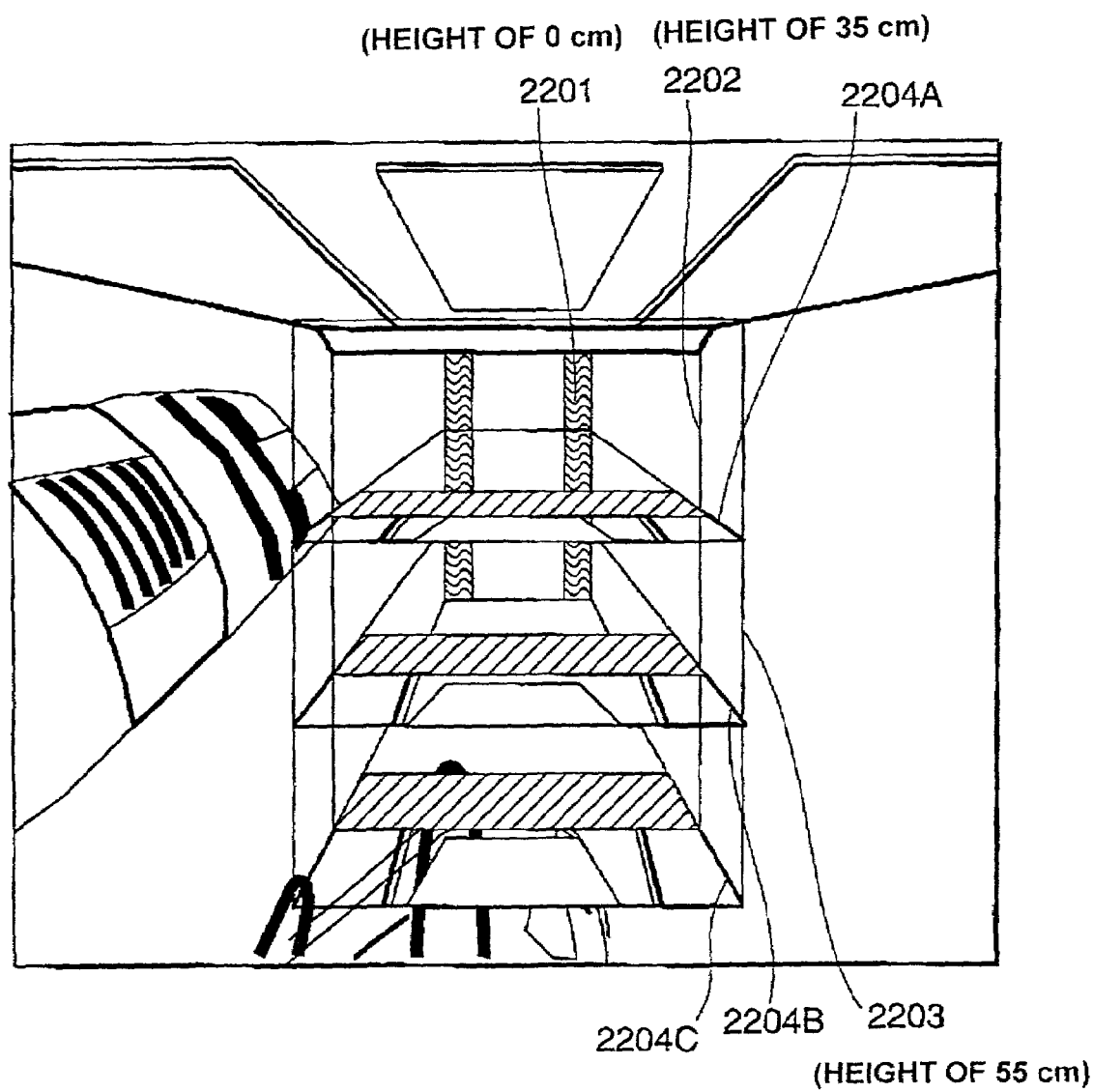
FIG. 25 is a screen constitution diagram of the image synthesis/display apparatus according to an eleventh embodiment of the present invention.

The constitution of the image synthesis/display apparatus according to an eleventh embodiment is the same as that of FIG. 18. FIG. 25 is a screen constitution diagram of the eleventh embodiment. The car will be described as a sedan hereinafter.

In FIG. 25, an auxiliary line 2201 is a road surface passage locus indicating the position obtained by projecting the position passed by the body end of the car onto the road surface, when the car linearly runs backwards. An auxiliary line 2202 is a bumper end passage locus indicating the position passed by the bumper end, when the car linearly runs backwards. An auxiliary line 2203 is a passage locus indicating the position passed by the body end of the car corresponding to the bumper position such as SUV having a bumper position higher than the bumper position of the car, when the car linearly runs backwards. Illustrations 2204A to 2204C are illustrations imitating car body surfaces of the rear part of the car, and states actually reflected in the image are shown as the illustrations when the car body rear part of the car is positioned in the respective positions. Additionally, the height of the illustration is assumed to be the same as the height of the auxiliary line 2203, but the height may not be necessarily the same, and the height of the auxiliary line 2203 may arbitrarily be determined.

As described above, according to the eleventh embodiment of the present invention, the road surface passage locus of the car linearly running backwards, the bumper end passage locus of the car, the bumper end passage locus such as SUV, and the illustration imitating the car body of the rear part of the car are simultaneously displayed. Therefore, the position relation between the advancing direction of the car and the object present around the car can be grasped by intuition.

Additionally, as described in the seventh and eighth embodiments, in combination with the illustration of the car, the illustration is moved or transformed for the screen, and used as the illustration imitating the car body surface of the rear part of the car, and the road surface passage locus is displayed like the tire trace. Thereby, the position relation between the advancing direction of the car and the object present around the car can be grasped by intuition.

Moreover, the mirror confirmation line in the sixth embodiment may also be displayed. As in the tenth embodiment, the auxiliary lines are moved in accordance with the steering angle of the car, and it is also possible to display the locus passed during the actual backward running. Additionally, only the position of the auxiliary line is exactly displayed, and the illustration imitating the rear part of the car may be selected from several predetermined types and superimposed upon the appropriate position.

Twelfth Embodiment

Figure 26:
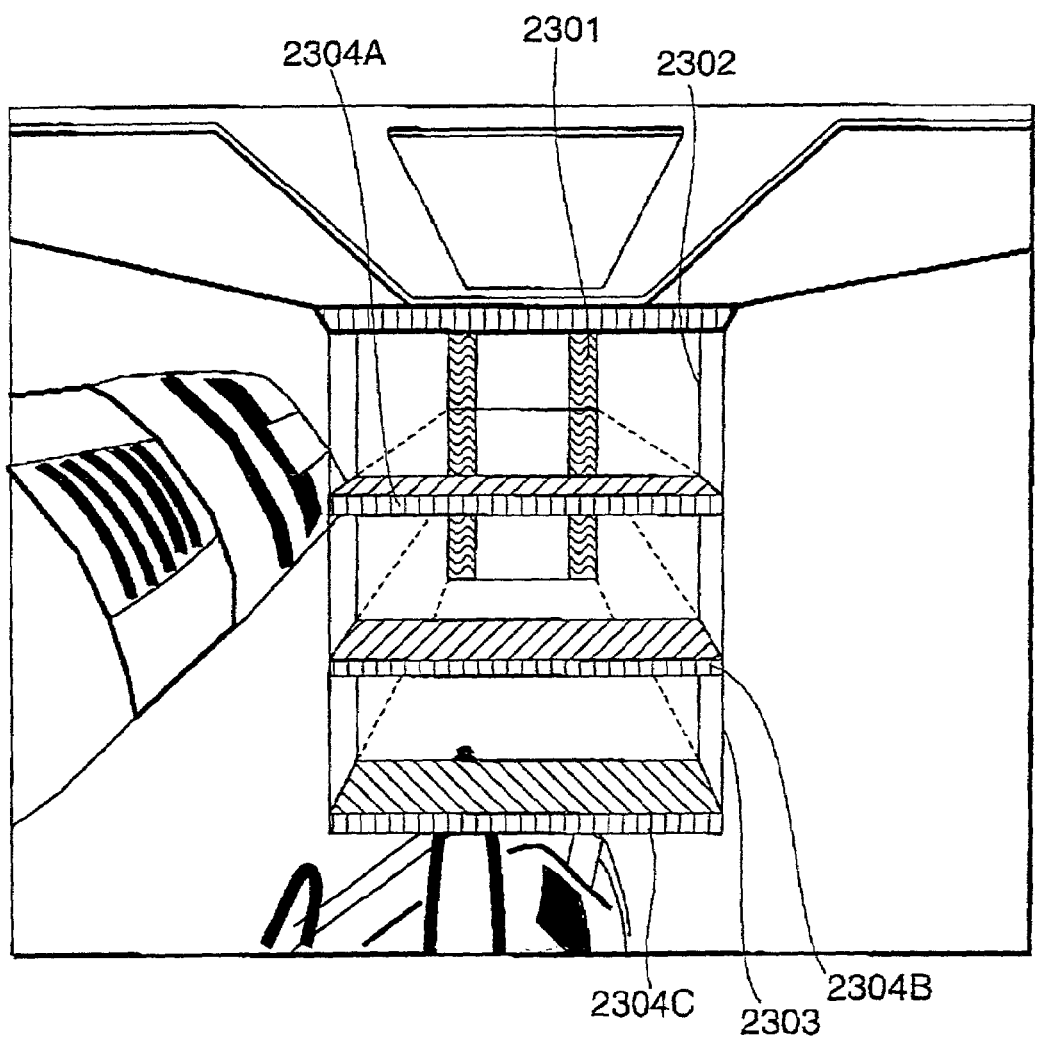
FIG. 26 is a screen constitution diagram of the image synthesis/display apparatus according to a twelfth embodiment of the present invention.

The constitution of the image synthesis/display apparatus according to a twelfth embodiment is the same as that of FIG. 18. FIG. 26 is a screen constitution diagram of the twelfth embodiment. The car will be described as a sedan hereinafter.

In FIG. 26, an auxiliary line 2301 is a road surface passage locus indicating the position obtained by projecting the position passed by the body end onto the road surface, when the car linearly runs backwards. An auxiliary line 2302 is a bumper lower surface end passage locus indicating the position passed by the end of the lower surface of the bumper, when the car linearly runs backwards. An auxiliary line 2303 is a bumper upper surface passage locus indicating the position passed by the end of the upper surface of the bumper, when the car linearly runs backwards. Illustrations 2304A to 2304C imitate the bumper, and a display state as the actual image is represented as the illustration, when only the bumper is present in the respective positions.

As described above, according to the twelfth embodiment of the present invention, the road surface passage locus of the car linearly running backwards, the bumper upper surface end passage locus, the bumper lower surface passage locus, and the illustration imitating the bumper of the car are simultaneously displayed. Therefore, the position relation between the advancing direction of the car and the object present around the car can be grasped by intuition.

Additionally, as in the seventh and eighth embodiments, in combination with the illustration of the car, the illustration is moved or transformed for the screen, and used as the illustration imitating the car body surface of the rear part of the car, and the road surface passage locus is displayed like the tire trace. Thereby, the position relation between the advancing direction of the car and the object present around the car can be grasped by intuition.

Moreover, the mirror confirmation line in the sixth embodiment may also be displayed. As in the tenth embodiment, the auxiliary lines are moved in accordance with the steering angle of the car, and it is also possible to display the locus passed during the actual backward running.

Thirteenth Embodiment

Figure 27:
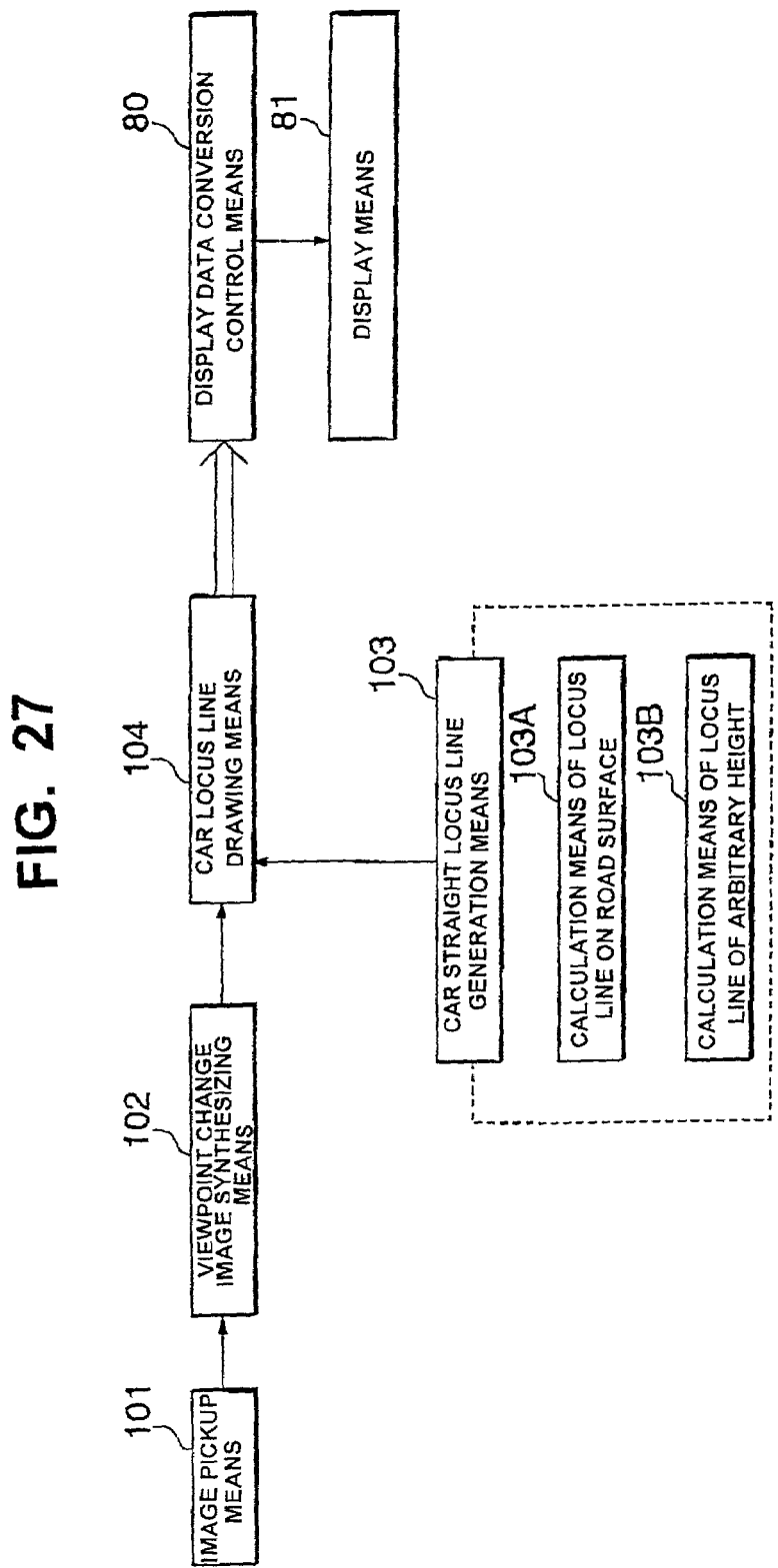
FIG. 27 is a block diagram showing the constitution of the image synthesis/display apparatus according to a thirteenth embodiment of the present invention.

FIG. 27 is a block diagram showing of the image synthesis/display apparatus according to a thirteenth embodiment of the present invention. The embodiment includes the display device omitted in the aforementioned embodiments. That is, as shown in FIG. 27, there are provided: display data conversion control means 80 for receiving display data as an output signal of the car locus line drawing means 104 and converting the data to a signal having a predetermined form; and display means 81 for receiving the display data obtained by the display data conversion control means 80 and displaying the data on the screen. The display means 81 may be a mirror having a display function, which is constituted by imparting the display function to a rear view mirror of the car.

In the constitution, since the image is displayed in the mirror having the display function, the operator can easily recognize the surrounding situation and the car position. Additionally, the mirror having the display function is constituted by superposing a half mirror upon the surface of a display portion of the display means 81 such as liquid crystal and organic electro luminescence (EL). The liquid crystal or organic EL portion may constitute one display portion, or an aggregate group of a plurality of display portions, and is constituted of at least one display portion.

Furthermore, the mirror constitution can be changed over to a state for operating as a usual mirror, or a state for operating as an image display screen. In this change over operation, a luminance sensor built in the car can automatically change the state to an image display state at night. Moreover, the operator may change the state in response to an operation for turning on a headlight. Moreover, the state may be changed to the image display state by turning on a thermal heater of a rear window, when the rear window fogs by rain, or the rear cannot be viewed by snow or icing in winter season. Furthermore, for the changeover, in cooperation with a gear, the state may be changed to the image display state only when the car is put in a reverse gear.

As described above, the mirror whole surface can be changed to the mirror state or the image display state. Therefore, the operator can easily grasp the situation behind the car with a wide display surface and can safely drive the car.

As another mirror constitution replacing the aforementioned mirror constitution, the usual mirror is disposed together with the liquid crystal or organic EL display portion. In this replacing mirror constitution, the rear situation is roughly grasped with the usual mirror portion, and it is possible to enlarge and display a portion as a blind spot in the usual display portion, or to enlarge and display an object portion requiring particular attention with the additionally disposed display portion. Additionally, these display means 81 are not limited to the mirror. Examples of the display means include a display portion disposed in a dashboard, a display connected to a navigation system, an information mobile terminal, a head-up display, and the like.

Fourteenth Embodiment

Figure 28:
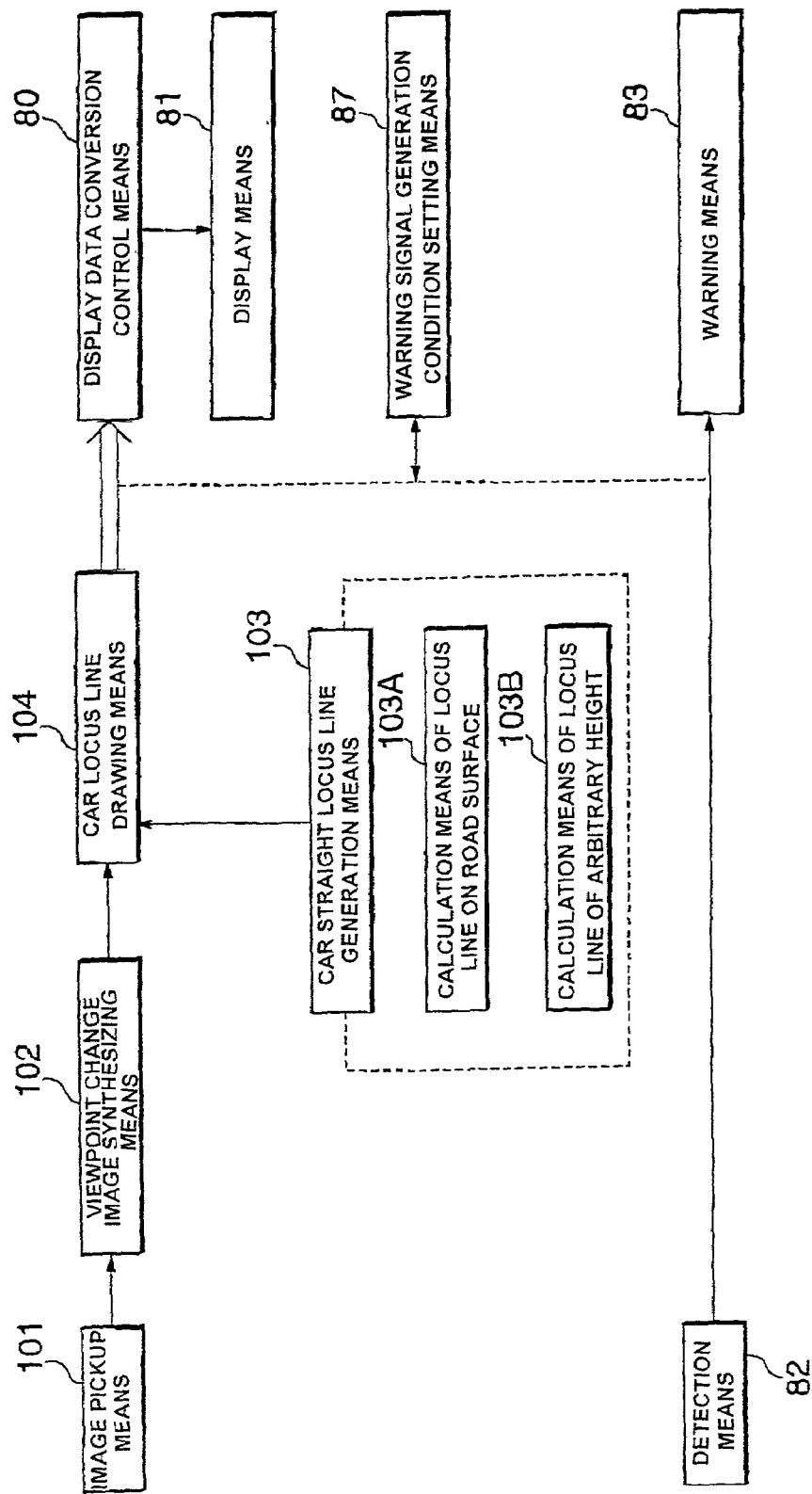
FIG. 28 is a block diagram of an image acquirement/warning apparatus according to a fourteenth embodiment of the present invention.

FIG. 28 is a block diagram of an image acquirement/warning apparatus according to a fourteenth embodiment of the present invention. In the embodiment, in addition to the constitution of the thirteenth embodiment, there are provided: detection means 82 disposed in the rear part of the car; and warning means 83 responding to an output signal of the detection means 82. The detection means 82 detects the abnormal approach of the objects such as a camping car being connected to the car as a connection object. When the distance between the car and the connection object is shorter than a predetermined distance, the abnormal approach can be judged.

By this constitution, an approach sensor as the detection means 82 is used to detect the approach of the camping car as the connection object, and an approach state is confirmed with the image. When a distance between a pair of load carrier hitches on a car side and on a camping car side is within a first predetermined distance such as one meter and a second predetermine distance such as 50 cm, a speaker as the warning means 83 can emit a warning sound to warn the operator respectively. The warning sound can be varied. As described above, in the connection operation of the load carrier hitches, while the connection operation is checked with the image, an appropriate warning can be emitted in accordance with the approach state (in the distance arbitrarily set in accordance with the connection operation), and the connection operation can safely and securely be performed.

Additionally, the warning means 83 has been described as the speaker, but is not limited to the speaker. The means is connected as shown by a dotted line of FIG. 28, and transmits a warning signal, so that a warning symbol image, a blinking image, or a color appropriate for calling an attention may be superimposed and displayed upon the image in the display device. Furthermore, alarming signal generation condition setting means 87 can be used to arbitrarily set a condition for issuing warning information in accordance with a size, weight, speed, and the like of the car or the connection object.

In further constitution, the image pickup unit may be attached to the load carrier hitch, and a state of completion of the connection may be confirmed at the last moment.

Moreover, the detection means 82 may be ultrasonic, electromagnetic, or optical (including infrared rays), or may be of a system in which the distance is directly calculated from the image and which issues a warning.

Furthermore, the connection object may be other than a camping car like a load carrier with a board carried thereon, or the like.

Fifteenth Embodiment

Figure 29:
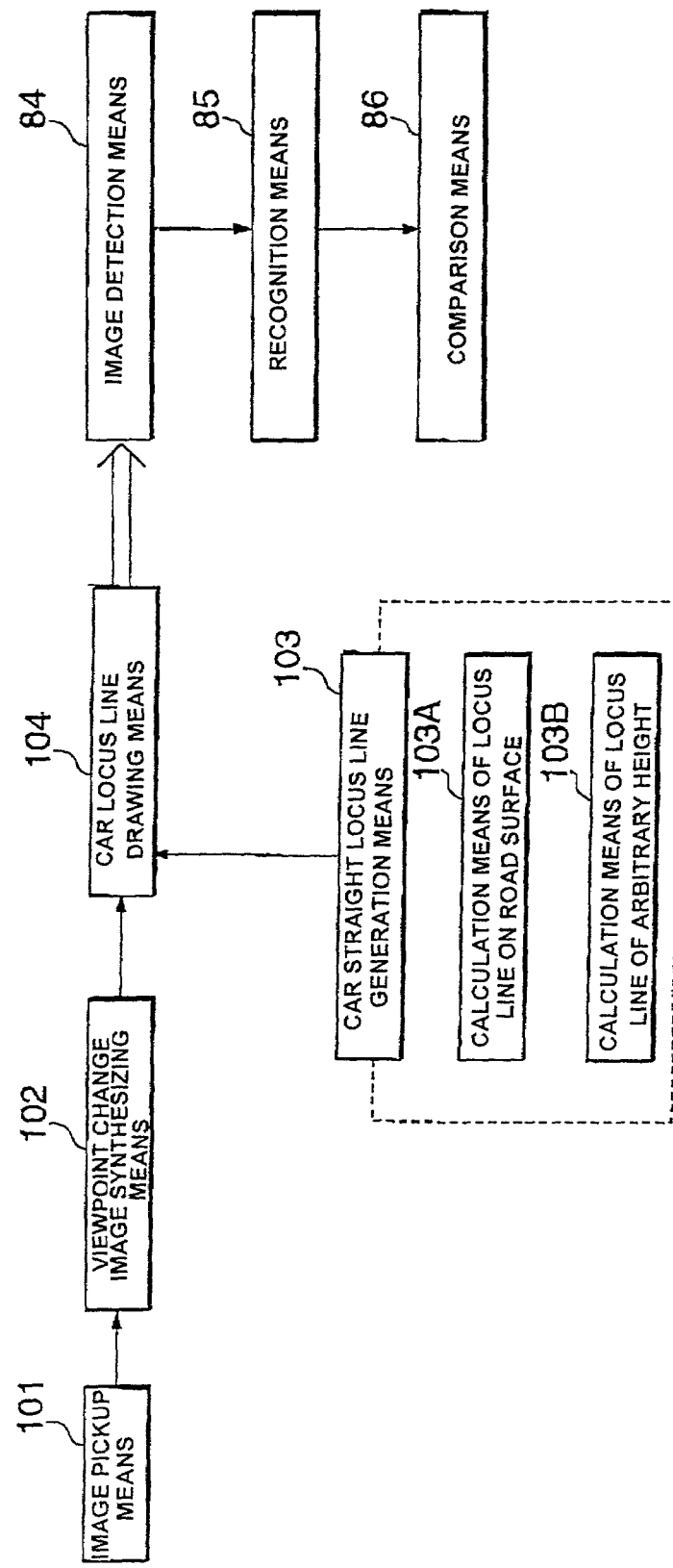
FIG. 29 is a block diagram of a car position recognition apparatus according to a fifteenth embodiment of the present invention.
Figure 30:
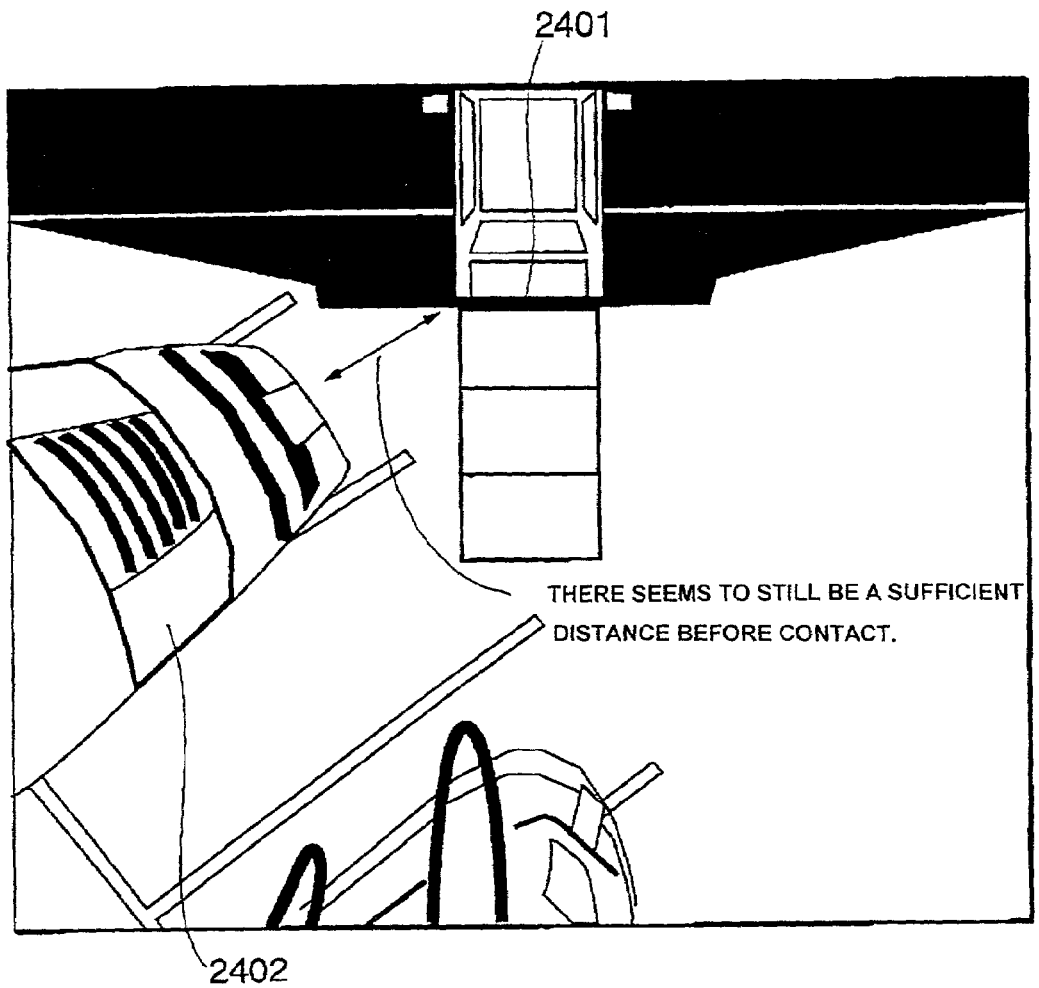
FIG. 30 is a screen constitution diagram of a conventional rear view field display apparatus.
Figure 31:
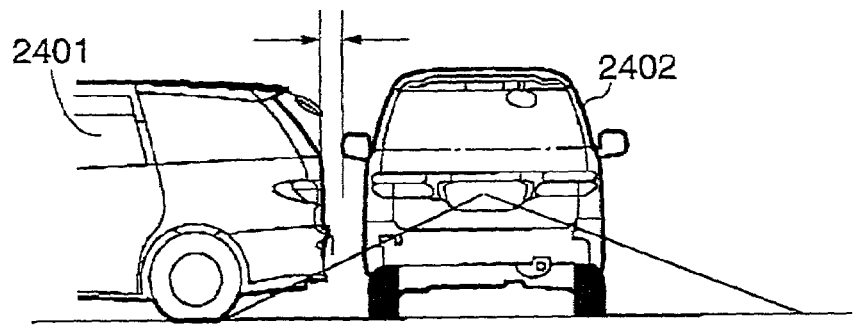
FIG. 31 is a position relation diagram of a car showing a problem of the conventional rear view field display apparatus.

FIG. 29 is a block diagram of a car position recognition apparatus according to a fifteenth embodiment. In the embodiment, in addition to the first to twelfth embodiments, the image behind the car is processed, the image of the arbitrary object is detected, the position relation between the detected image and the image of the car is recognized, the recognized position relation is compared with the predetermined position relation, and a deviation amount between the relations is detected. That is, the car position recognition apparatus of the fifteenth embodiment includes: image detection means 84 for detecting the image of the arbitrary object from the image obtained by rear image pickup means of the image pickup means 101 or the image synthesized by the picture synthesizing apparatus of any one of the first to twelfth embodiments; recognition means 85 for recognizing the position relation between the image detected by the image detection means 84 and the image of the car; and comparison means 86 for comparing the position relation recognized by the recognition means and the predetermined position relation and detecting the deviation amount from these position relations. As the rear image pickup means, a camera disposed in the rear of the car may be used. Thereby, a white line on the road surface indicating a parking space behind the car is photographed. The image detection means 84 detects the white line indicating the parking space from the image obtained by the rear image pickup means, the image projected onto a three-dimensional projection model obtained by combining a cylindrical surface and spherical surface, or the image synthesized by the image synthesizing means. The recognition means 85 calculates and recognizes the position relation between the detected white line and the image of the car from the image data. The comparison means 86 compares the actual position relation recognized by the recognition means 85 with the predetermined position relation in which a center of the image of the car is positioned in the middle between right and left white lines defining the parking space, and detects the deviation amount from these position relations. Additionally, when the deviation amount is abnormally large, the car is moved backwards, but the car cannot be parked between the right and left white lines. Therefore, the warning may be issued in the constitution.

According to the constitution, the driver can confirm the white lines defining the parking space with the image while driving the car backwards, and can easily grasp the position relation between the car and the parking space together with the position relation between the car and the surrounding situation behind the car, so that safer driving is achieved.

As described above, according to the present invention, the appropriate illustration, auxiliary line, locus line, and the like are superimposed upon the pseudo image from the virtual viewpoint. Thereby, the driver can grasp the three-dimensional position relation between the car and the surrounding solid object by intuition. As a result, an appropriate contact judgment is facilitated. The picture synthesizing apparatus having these superior effects can be provided.

What is claimed is:

1. A picture synthesizing apparatus comprising:
   an image pickup means that is in operative association with a vehicle disposed on a road surface and that is adapted to obtain an original image of an object outside said vehicle as viewed from a viewpoint of the image pickup means;
   a viewpoint change image synthesizing means that is adapted to produce a synthesized image, in which the outside object is viewed from a virtual viewpoint different from the viewpoint of the image pickup means and different, from the original image obtained by said image pickup means; wherein said synthesizing means is adapted to draw the synthesized image on a plane corresponding to the road surface;
   a vehicle locus line generation means that is adapted to generate a locus line of said vehicle placed at an arbitrary height above the road surface;
   a vehicle locus line drawing means that is adapted to draw the locus line, generated by said vehicle locus line generation means, on the synthesized image produced by said viewpoint change image synthesizing means such that the drawn locus line is adapted to be viewed from the viewpoint of the image pick up means, wherein when the locus line as viewed from the viewpoint of the image pickup means is projected onto the road surface to form a first projected line, the first projected line is viewed from a virtual viewpoint, and the first projected line viewed from the virtual viewpoint is again projected onto the plane corresponding to the road surface to obtain a second projected line as the locus line drawn on the synthesized image; a storage means that is adapted to store predetermined auxiliary data; and
   a drawing means that is adapted to superimpose stored auxiliary data upon a synthesized image produced by said viewpoint change image synthesizing means based on auxiliary data read from said storage means;
   wherein said image pick up means is adapted to obtain an original image in which a rear part of said vehicle is positioned in a view field; and
   wherein said picture synthesizing apparatus is adapted to represent said vehicle by an illustration of a skeleton or a wire frame, and is adapted to provide an image including a portion of said vehicle comprising a tire that is likely to come into contact with said outside object.

2. The picture synthesizing apparatus according to claim 1 wherein said vehicle locus line generation means comprises three-dimensional locus line generation means, road surface projection means, and synthesized image projection means.

3. The picture synthesizing apparatus according to claim 1 wherein said vehicle locus line generation means is adapted to generate a locus line that represents a vehicle that is moving linearly.

4. The picture synthesizing apparatus according to claim 1, further comprising steering wheel angle information output means that is adapted to output an angle of a a steering wheel of said vehicle, wherein said vehicle locus line generation means is adapted to generate a the locus line that is in accordance with said steering wheel angle information.

5. The picture synthesizing apparatus according to claim 4 further comprising a function for drawing a section of said vehicle moved apart from a rear end of said vehicle along said locus line with an elapse of time on said synthesized image.

6. The picture synthesizing apparatus according to claim 4 further comprising a function for drawing a solid diagram of said vehicle moved apart from a rear end of said vehicle along said locus line as a function of an elapse of time on said synthesized image.

7. The picture synthesizing apparatus according to claim 4 wherein said vehicle locus line generation means comprises three-dimensional shape storage means, three-dimensional locus region generation means, road surface projection means, and synthesized image projection means.

8. The picture synthesizing apparatus according to claim 7 wherein said three-dimensional shape storage means is adapted to store a shape of said vehicle.

9. The picture synthesizing apparatus according to claim 7 wherein said three-dimensional shape storage means is adapted to store a shape of a rectangular parallelepiped inscribing said vehicle.

10. The picture synthesizing apparatus according to claim 7 wherein said three-dimensional shape storage means is adapted to store a shape of a bumper of said vehicle.

11. The picture synthesizing apparatus according to claim 4, further comprising obstacle collision prediction means for detecting an obstacle present outside and proximate to said vehicle, and means adapted to predict a possibility of collision of said vehicle with said obstacle upon movement of said vehicle in the direction of said obstacle.

12. The picture synthesizing apparatus according to claim 11 wherein said vehicle locus line drawing means is adapted not to draw the locus line of said vehicle ahead of a collision place, when said obstacle collision prediction means predicts the collision of said vehicle with said obstacle.

13. The picture synthesizing apparatus according to claim 11 wherein said vehicle locus line drawing means is adapted to emphasize and display a place, when and where said obstacle collision prediction means predicts the collision of said vehicle with said obstacle.

14. The picture synthesizing apparatus according to claim 4, further comprising multi screen generation means for displaying the image synthesized by said viewpoint change image synthesizing means in a multiplicity of divided screens.

15. The picture synthesizing apparatus according to claim 14 wherein said vehicle locus line drawing means is adapted to draw a locus of the vehicle in each screen generated by said multi-screen generation means.

16. The picture synthesizing apparatus according to claim 15 wherein said vehicle locus line drawing means is adapted to draw the locus line or a vehicle frame indicating the same position in the same color in different screens, when said locus line is drawn in a plurality of screens.

17. The picture synthesizing apparatus according to claim 14 wherein said image pickup means includes at least one of means for picking up an image behind said vehicle, and means for picking up an image beside said vehicle.

18. The picture synthesizing apparatus according to claim 14 wherein said vehicle locus line drawing means is adapted to draw a locus line of a rear end of said vehicle on an image beside said vehicle, or an image obtained by converting said image beside the vehicle.

19. The picture synthesizing apparatus according to claim 1 further comprising a function that is adapted to interpolate a locus line on a road surface associated with said vehicle; wherein the locus line is adapted to be at an arbitrary height with respect to said road surface, and is adapted to draw a line vertical to said road surface on said synthesized image.

20. The picture synthesizing apparatus according to claim 1 further comprising means that are adapted to draw a locus line of a bumper of said vehicle and/or a locus line of a vehicle height on said synthesized image.

21. The picture synthesizing apparatus according to claim 1 that has a function of changing a color or a thickness of said locus line in accordance with a distance from said vehicle and drawing the locus line in said color or thickness to identify said distance.

22. The picture synthesizing apparatus according to claim 1 comprising:
an auxiliary line generation means that is adapted to draw an auxiliary line adapted to indicate an arbitrary position apart from said vehicle; and
an auxiliary line drawing means that is adapted to draw an auxiliary line generated by said auxiliary line generation means on a synthesized image produced by said viewpoint change image synthesizing means.

23. The picture synthesizing apparatus according to claim 22, further comprising multi-screen generation means for displaying the image synthesized by said viewpoint change image synthesizing means in a multiplicity of divided screens, wherein said auxiliary line drawing means is adapted to draw the generated auxiliary line in each screen generated by said multi-screen generation means.

24. The picture synthesizing apparatus according to claim 22 wherein said auxiliary line generation means is adapted to generate an auxiliary line indicating a position of a rear end of said vehicle.

25. The picture synthesizing apparatus according to claim 22 wherein said auxiliary line generation means is adapted to generate an auxiliary line indicating a constant distance from a rear end of said vehicle.

26. The picture synthesizing apparatus according to claim 22 wherein said auxiliary line generation means is adapted to generate an auxiliary line indicating a width of a general vehicle.

27. The picture synthesizing apparatus according to claim 1 that has a function that is adapted to superimpose an auxiliary line upon a rear edge of said vehicle, and that is adapted to provide an image emphasizing/indicating the corresponding position.

28. The picture synthesizing apparatus according to claim 1 that has a function of providing an image showing a three dimensional illustration prepared as if the image of said vehicle were picked up by an actually disposed image pick up unit and converted/synthesized.

29. The picture synthesizing apparatus according to claim 1 wherein said portion of said vehicle that is adapted to come into contact with said outside object comprises a tire or a bumper.

30. The picture synthesizing apparatus according to claim 29 that has a function that is adapted to provide an image obtained by transforming/synthesizing an image actually obtained by said image pickup means in a region corresponding to a bumper of the illustration.

31. The picture synthesizing apparatus according to claim 1 that has a function that is adapted to provide an image showing a mirror confirmation line behind a rear end of a bumper of said vehicle by a constant distance and is adapted to be disposed horizontally with said bumper.

32. The picture synthesizing apparatus according to claim 1 that has a function that is adapted to superimpose an illustration of two wall surfaces disposed vertically to a road surface in a rear end position of said vehicle, and on an inner side of the rear end position of said vehicle, and having the same width as a width of said vehicle upon a displayed image, and providing an image metaphorically representing said vehicle as a solid object.

33. The picture synthesizing apparatus according to claim 1 that has a function that is adapted to provide an image including a road surface passage locus indicating a position obtained by projecting a position passed by a body end of said vehicle onto a road surface, and a bumper end passage locus indicating a position passed by a bumper end of said vehicle, when said vehicle moves backwards, and a solid auxiliary line for connecting the loci to produce a solid sense.

34. The picture synthesizing apparatus according to claim 33 that has a function that is adapted to provide an image showing said road surface locus like a tire trace, and is adapted to indicate the bumper end passage locus connected to a bumper end of an actual image or an illustration of said vehicle.

35. The picture synthesizing apparatus according to claim 33 that has a function that is adapted to provide an image showing said road surface passage locus drawn from a perspective of a tire explicitly indicated in an illustration.

36. The picture synthesizing apparatus according to claim 35 that has a function that is adapted to provide an image showing a mirror confirmation line that is a constant distance behind a rear end of a bumper of said vehicle and is horizontal with said bumper.

37. The picture synthesizing apparatus according to claim 33 that further comprises a locus calculation unit that is adapted to calculate a predicted locus from a steering angle signal inputted from the outside, and that has a function that is adapted to provide an image including a road surface passage locus corresponding to a steering angle of said vehicle, a bumper end passage locus corresponding to the steering angle of said vehicle, and a solid auxiliary line for connecting the loci to produce a solid sense.

38. The picture synthesizing apparatus according to claim 1 that has a function that is adapted to provide an image simultaneously showing a road surface passage locus, a bumper end passage locus, and a passage locus indicating a position passed by an appropriate height portion of a body of a vehicle, when said vehicle moves backwards.

39. The picture synthesizing apparatus according to claim 38 that has a function that is adapted to provide an image showing said road surface passage locus like a tire trace, and indicating said bumper end passage locus connected to a bumper end of an actual image or an illustration.

40. The picture synthesizing apparatus according to claim 38 that has a function that is adapted to provide an image showing said road surface passage locus drawn from a tire explicitly indicated in an illustration.

41. The picture synthesizing apparatus according to claim 40 that has a function that is adapted to provide an image showing a mirror confirmation line behind a rear end of a bumper of said vehicle by a constant distance and horizontally with said bumper.

42. The picture synthesizing apparatus according to claim 38 that further comprises a locus calculation unit that is adapted to calculate a predicted locus from a steering angle signal inputted from the outside, and that has a function that is adapted to provide an image that is adapted to simultaneously show road surface passage locus corresponding to a steering angle of said vehicle, said bumper end passage locus corresponding to the steering angle of said vehicle, a passage locus indicating a position passed by an appropriate height portion of a body of said vehicle, and an illustration representing a rear part of said vehicle.

43. The picture synthesizing apparatus according to claim 1 that has a function that is adapted to provide an image simultaneously showing a road surface passage locus, a bumper upper surface locus indicating a position passed by an end of a bumper upper surface of said vehicle, a bumper lower surface passage locus indicating a position passed by an end of a bumper lower surface of said vehicle, and an illustration imitating a rear part of said vehicle, when said vehicle moves backwards.

44. The picture synthesizing apparatus according to claim 43 that has a function that is adapted to provide an image showing said road surface passage locus like a tire trace, and is adapted to indicate the bumper end passage locus connected to a bumper end of an actual image or an illustration of the vehicle.

45. The picture synthesizing apparatus according to claim 43 that has a function that is adapted to provide an image showing said road surface passage locus drawn from a tire explicitly indicated in an illustration.

46. The picture synthesizing apparatus according to claim 45 that has a function that is adapted to provide an image showing a mirror confirmation line that is a constant distance behind a rear end of a bumper of said vehicle and is disposed horizontal to the bumper.

47. The picture synthesizing apparatus according to claim 43 that further comprises a locus calculation unit adapted to calculate a predicted locus from a steering angle signal inputted from outside, and that has a function that is adapted to provide an image simultaneously showing said road surface passage locus corresponding to the steering angle of said vehicle, said bumper lower surface passage locus corresponding to the steering angle of said vehicle, and an illustration representing a bumper of said vehicle.

48. The picture synthesizing apparatus as claimed in claim 1 wherein said vehicle is a car.

49. An image synthesis/display apparatus comprising:

a picture synthesizing apparatus comprising:

an image pickup means that is adapted to be attached to a vehicle, that is adapted to be disposed on a road surface, and is enabled to obtain an original image of an object that is outside said vehicle and is adapted to be viewed from a viewpoint of the image pickup means;

a viewpoint change image synthesizing means that is adapted to produce a synthesized image, in which the outside object is viewed from a virtual viewpoint that is different from the viewpoint of the image pickup means, from the original image obtained by said image pickup means and is adapted to draw the synthesized image on a plane corresponding to the road surface;

a vehicle locus line generation means that is adapted to generate a locus line of said vehicle placed at an arbitrary height from the road surface; and a vehicle locus line drawing means that is adapted to draw the locus line generated by said vehicle locus line generation means on the synthesized image produced by said viewpoint change image synthesizing means such that the locus line is viewed from the viewpoint of the image pickup means, wherein the locus line viewed from the viewpoint of the image pickup means is adapted to be projected onto the road surface to obtain a first projected line on the road surface, the first projected line is adapted to be viewed from the virtual viewpoint, and the first projected line as viewed from the virtual viewpoint is adapted to again be projected onto the plane corresponding to the road surface to obtain a second projected line as the locus line drawn on the synthesized image;

a display means that is adapted to display a combined image of the synthesized image and an image of the locus line drawn on the plane by said picture synthesizing apparatus;

a display data conversion means that is adapted to convert said combined image to be displayed into data suitable for said display means storage means that is adapted to store auxiliary data; and a drawing means that is adapted to superimpose stored auxiliary data upon a synthesized image produced by said viewpoint change image synthesizing means based on auxiliary data read from said storage means;

wherein said image pick up means is adapted to obtain an original image in which a rear part of said vehicle is positioned in a view field, wherein said viewpoint change image is adapted to produce a synthesized image including an image of at least a rear portion of said vehicle, and wherein said picture synthesizing apparatuis is adapted to represent said vehicle by an illustration of a skeleton or wire frame, and is adapted to provide an image that is adapted to explicitly indicate a portion of said vehicle comprising a tire that is adapted to come into contact with said outside object.

50. The image synthesis/display apparatus according to claim 49, further comprising:

an auxiliary line generation means that is adapted to generate an auxiliary line indicating an arbitrary position apart from said vehicle; and an auxiliary line drawing means that is adapted to draw the auxiliary line generated by said auxiliary line generation means on the synthesized image produced by said viewpoint change image synthesizing means;

wherein said display means is adapted to display the synthesized image including the auxiliary line; and wherein the display data conversion means is adapted to convert said synthesized image including the auxiliary line to be displayed into data suitable for said display means.

51. The image synthesis/display apparatus as claimed in claim 49 wherein said vehicle is a car.

52. An image acquirement warning apparatus comprising:

detection means for detecting an approaching state of an object that is outside a vehicle and is immanent to collide with said vehicle, wherein the direction of the approaching state indicates that the object is adapted to collide with the vehicle;

a picture synthesizing apparatus comprising:

an image pickup means that is attached to said vehicle and/or said object and is adapted to obtain an original image of an object outside said vehicle viewed from a viewpoint of the image pickup means;

a viewpoint change image synthesizing means that is adapted to produce a synthesized image, in which the outside object is adapted to be viewed from a virtual viewpoint different from the viewpoint of the image pickup means, and different from the original image obtained by said image pickup means and is adapted to draw the synthesized image on a plane corresponding to the road surface;

a vehicle locus line generation means adapted to generate a locus line of said vehicle placed at an arbitrary height above the road surface;

a vehicle locus line drawing means adapted to draw the locus line generated by said vehicle locus line generation means on the synthesized image produced by said viewpoint change image synthesizing means such that when the locus line is viewed from the viewpoint of the image pickup means, the locus line viewed from the viewpoint of the image pickup means is adapted to be projected onto the road surface to obtain a first projected line on the road surface, the first projected line is adapted to be viewed from a vertical viewpoint, and the first projected line viewed from the vertical viewpoint is again projected onto the plane corresponding to the road surface to obtain a second projected line as the locus line drawn on the synthesized image;

warning means for generating a warning signal as a result of said approaching state determined by said detection means and/or a relation between said vehicle and said outside object in the image synthesized by said picture synthesizing apparatus a storage means that is adapted to store predetermined data beforehand;

a drawing means that is adapted to superimpose predetermined auxiliary data upon the synthesized image produced by said viewpoint change image synthesizing means based on the data read from said storage means;

wherein said image pickup means is adapted to obtain an original image in which a rear part of said vehicle is positioned in a view field; and wherein said picture synthesizing apparatus is adapted to represent said vehicle by an illustration of a skeleton or a wire frame, and is adapted to provide an image including a portion of said vehicle, comprising a tire, that is likely to come into contact with said outside object.

53. The image acquirement warning apparatus according to claim 52, wherein said picture synthesizing apparatus further comprises:

an auxiliary line generation means that is adapted to generate an auxiliary line indicating an arbitrary position apart from said vehicle; and an auxiliary line drawing means that is adapted to draw the auxiliary line generated by said auxiliary line generation means on the synthesized image produced by said viewpoint change image synthesizing means; and wherein said warning means is adapted to cause a warning signal to be generated in response to the approaching state identified by said detection means and/or a spatial relation between said vehicle and said outside object in the synthesized image including the auxiliary line.

54. The image acquirement warning apparatus according to claim 52, wherein the picture synthesizing apparatus further comprises:

a storage means that is adapted to store predetermined data beforehand; and a drawing means that is adapted to superimpose predetermined auxiliary data upon the synthesized image produced by said viewpoint change image synthesizing means based on the data read from said storage means.

55. The image acquirement warning apparatus according to claim 52, further comprising warning signal generation condition setting means for a user to arbitrarily set a condition for generating the warning signal by said warning means.

56. The image acquirement warning apparatus as claimed in claim 52 wherein said vehicle is a car.

57. A vehicle position recognition apparatus comprising:

a picture synthesizing apparatus comprising:

a plurality of image pickup means that are adapted to be attached to a vehicle that is adapted to be disposed on a road surface, and includes a rear image pickup means for picking up an original image of an outside object disposed behind said vehicle;

a viewpoint change image synthesizing means that is adapted to produce a synthesized image, in which the outside object is viewed from a virtual viewpoint different from the viewpoints of the image pickup means, and from the original image obtained by said image pickup means, and is adapted to draw the synthesized image on a plane corresponding to the road surface;

a vehicle locus line generation means that is adapted to generate a locus line of said vehicle placed at an arbitrary height from the road surface;

a vehicle locus line drawing means that is adapted to draw the locus line generated by said vehicle locus line generation means on the synthesized image produced by said viewpoint change image synthesizing means such that the locus line is adapted to be viewed from the viewpoint of the image pickup means, the locus line viewed from the viewpoint of the image pickup means is adapted to be projected onto the road surface to obtain a first projected line on the road surface, the first projected line viewed from the vertical viewpoint is adapted to again be projected onto the plane corresponding to the road surface to obtain a second projected line as the locus line drawn on the synthesized image;

an image detection means that is adapted to detect an image of an arbitrary object from the original image obtained by said rear image pickup means or the synthesized image produced by said picture synthesizing apparatus;

a recognition means that is adapted to recognize a spatial relation between the image of the arbitrary object detected by said image detection means and the image of said vehicle;

a comparison means that is adapted to compare said spatial relation recognized by said recognition means with a predetermined position relation, and is adapted to detect an amount of deviation between the recognized spatial relations from the predetermined position relations;

a storage means that is adapted to store predetermined data beforehand;

a drawing means that is adapted to superimpose predetermined auxiliary data upon the synthesized image produced by said viewpoint change image synthesizing means based on the data read from said storage means;

wherein said image pickup means is adapted to obtain an original image in which a rear part of said vehicle is positioned in a view field; and wherein said picture synthesizing apparatus is adapted to represent said vehicle by an illustration of a skeleton or a wire frame, and is adapted to provide an image including a portion of said vehicle, comprising a tire, that is likely to come into contact with said outside object.

58. The vehicle position recognition apparatus according to claim 57:

wherein said picture synthesizing apparatus further comprises:

an auxiliary line generation means that is adapted to draw an auxiliary line indicating an arbitrary position apart from said vehicle; and an auxiliary line drawing means that is adapted to draw the auxiliary line generated by said auxiliary line generation means on the synthesized image produced by said viewpoint change image synthesizing means.

59. A vehicle position recognition apparatus as claimed in claim 57 wherein said vehicle is a car.

60. The image vehicle position recognition apparatus as claimed in claim 57 wherein said vehicle is a car.

* * * * *